(12) United States Patent
Taniguchi et al.

(10) Patent No.: US 12,253,482 B2
(45) Date of Patent: Mar. 18, 2025

(54) METHOD FOR DETERMINING STRUCTURE OF SUBSTANCE IN MULTICOMPONENT SAMPLE

(71) Applicant: KIRIN HOLDINGS KABUSHIKI KAISHA, Tokyo (JP)

(72) Inventors: Yoshimasa Taniguchi, Tokyo (JP); Mayuka Miwa, Tokyo (JP); Naoya Kitada, Tokyo (JP); Hotaka Sanda, Tokyo (JP); Takayuki Nishimura, Tokyo (JP); Eriko Takeshi, Tokyo (JP)

(73) Assignee: KIRIN HOLDINGS KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 17/773,645

(22) PCT Filed: Oct. 30, 2020

(86) PCT No.: PCT/JP2020/040979
§ 371 (c)(1),
(2) Date: May 2, 2022

(87) PCT Pub. No.: WO2021/085645
PCT Pub. Date: May 6, 2021

(65) Prior Publication Data
US 2022/0381708 A1 Dec. 1, 2022

(30) Foreign Application Priority Data
Nov. 1, 2019 (JP) .................................. 2019-200020
Jan. 30, 2020 (JP) .................................. 2020-014066

(51) Int. Cl.
*G01N 30/02* (2006.01)
*G01N 23/20* (2018.01)
(Continued)

(52) U.S. Cl.
CPC ......... *G01N 23/2005* (2013.01); *G01N 30/02* (2013.01); *G01N 30/88* (2013.01);
(Continued)

(58) Field of Classification Search
CPC .... G01N 23/2005; G01N 30/02; G01N 30/26; G01N 30/88; G01N 2223/0566; G01N 2223/607
See application file for complete search history.

(56) References Cited

U.S. PATENT DOCUMENTS

| 4,639,360 A | 1/1987 | Valyocsik |
| 2006/0159226 A1 | 7/2006 | Jhoti et al. |

(Continued)

FOREIGN PATENT DOCUMENTS

| CN | 103382185 A | 11/2013 |
| CN | 110283328 A | 9/2019 |

(Continued)

OTHER PUBLICATIONS

Ishibashi et al., "High-throughput simultaneous analysis of pesticides by supercritical fluid chromatography/tandem mass spectrometry", Journal of Chromatography A, vol. 1266, 2012, pp. 143-148 (6 pages total).

(Continued)

*Primary Examiner* — Mark R Gaworecki
(74) *Attorney, Agent, or Firm* — Sughrue Mion, PLLC

(57) ABSTRACT

An object of the present invention is to provide a novel method for determining the structure of a target substance contained in a multicomponent sample. The present invention provides a method of determining the structure of a target substance contained in a mixture of two or more substances, wherein the method includes the steps of: isolating the target substance from the mixture by means of supercritical fluid chromatography, soaking the isolated tar- (Continued)

get substance into a crystalline sponge to produce a sample for crystallography, and performing a crystallographic analysis on the sample for crystallography. A volatile solvent can be used as a mobile phase in the supercritical fluid chromatography.

7 Claims, 25 Drawing Sheets

(51) Int. Cl.
  G01N 23/2005 (2018.01)
  G01N 30/26 (2006.01)
  G01N 30/88 (2006.01)
(52) U.S. Cl.
  CPC ..... G01N 30/26 (2013.01); G01N 2223/0566 (2013.01); G01N 2223/607 (2013.01)

(56) References Cited

U.S. PATENT DOCUMENTS

| | | | |
|---|---|---|---|
| 2014/0014585 | A1 | 1/2014 | Dourdeville et al. |
| 2015/0219533 | A1 | 8/2015 | Fujita et al. |
| 2017/0362282 | A1 | 12/2017 | Snow et al. |
| 2019/0112309 | A1 | 4/2019 | Li et al. |
| 2019/0248814 | A1 | 8/2019 | Wang et al. |
| 2020/0096461 | A1 | 3/2020 | Fujita et al. |
| 2022/0011251 | A1 | 1/2022 | Sato |

FOREIGN PATENT DOCUMENTS

| | | |
|---|---|---|
| EP | 3 786 623 A1 | 3/2021 |
| EP | 3 885 746 A1 | 9/2021 |
| JP | 2005-353289 A | 12/2005 |
| JP | 2016-80542 A | 5/2016 |
| JP | 5969616 B2 | 8/2016 |
| JP | 2019-513143 A | 5/2019 |
| JP | 2019-172593 A | 10/2019 |
| WO | 2018/118109 A1 | 6/2018 |
| WO | 2018/159692 A1 | 9/2018 |
| WO | 2020/105718 A1 | 5/2020 |
| WO | 2020/105723 A1 | 5/2020 |

OTHER PUBLICATIONS

Ishibashi et al., "High-Throughput Simultaneous Analysis of Pesticides by Supercritical Fluid Chromatography Coupled with High-Resolution Mass Spectrometry", J. Agric. Food Chem. vol. 63, pp. 4457-4463, 2015 (7 pages total).

Taguchi et al., "Simultaneous analysis for water- and fat-soluble vitamins by a novel single chromatography technique unifying supercritical fluid chromatography and liquid chromatography", Journal of Chromatography A, vol. 1362, pp. 270-277, 2014 (8 pages total).

Kalíková et al., "Supercritical fluid chromatography as a tool for enantioselective separation; A review", Analytica Chimica Acta, vol. 821, pp. 1-33, 2014 (33 pages total).

Inokuma et al., "Crystal structure analysis "crystal sponge" method that overturns common sense", Chemistry, vol. 68, No. 8, pp. 35-40, Aug. 1, 2013 (9 pages total).

Inokuma et al., "X-ray analysis on the nanogram to microgram scale using porous complexes", Nature, vol. 495, pp. 461-466, Mar. 28, 2013 (19 pages total).

Notification of Reason for Refusal, dated Nov. 24, 2020, issued by the Japanese Patent Office in JP Application No. 2020-183312.

Notification of Reason for Refusal, dated Jan. 26, 2021, issued by the Japanese Patent Office in JP Application No. 2020-183312.

Horikawa, "Good Use of Supercritical Fluid Chromatography", Chromatography, vol. 32, No. 3, pp. 153-159, Dec. 2011 (16 pages total).

Decision of Refusal, dated Mar. 16, 2021, issued by the Japanese Patent Office in JP Application No. 2020-183312.

Notification of Reason for Refusal, dated Oct. 12, 2021, issued by the Japanese Patent Office in JP Application No. 2020-183312 (appeal No. 2021-6919).

International Search Report for PCT/JP2020/040979, dated Dec. 1, 2020 [PCT/ISA/210].

Written Opinion for PCT/JP2020/040979, dated Dec. 1, 2020 [PCT/ISA/237].

International Preliminary Report on Patentability with the translation of Written Opinion, dated May 3, 2022, from the International Bureau in International Application No. PCT/JP2020/040979.

U.S. Appl. No. 17/778,568, filed May 20, 2022, Yoshimasa Taniguchi et al.

U.S. Appl. No. 17/778,531, filed May 20, 2022, Yoshimasa Taniguchi et al.

Fumie Sakurai, et al. "X-ray Structure Analysis of N-Containing Nucleophilic Compounds by the Crystalline Sponge Method", Chemistry A European Journal Communication, 2017, pp. 15035-15040, vol. 23.

Inokuma, Yasuhide et al., X-ray crystal structure analysis of extremely small amounts of compounds by the crystal sponge method, Pharmacia, 2014, vol. 50 No. 8, pp. 756-761.

International Search Report for PCT/JP2020/043385 dated Feb. 9, 2021 [PCT/ISA/210].

Katsuhiro Kobayashi, et al., "Correlation between crystallographic equivalence of pharmaceutical salt crystals and solid-state material properties", Lecture abstracts of the 138th Annual Meeting of the Pharmaceutical Society of Japan, Mar. 25, 2018, pp. 27PA-am292, in particular, columns "Purpose", "Method", non-official translation.

Notification of Reason of Refusal for Japanese Patent Application No. 2020-036307 dated Dec. 14, 2021.

International Search Report for PCT/JP2020/043383 dated Feb. 9, 2021.

Written Opinion for PCT/JP2020/043383 dated Feb. 9, 2021.

International Preliminary Report on Patentability with translation of Written Opinion issued May 17, 2022 in International Application No. PCT/JP2020/043385.

International Preliminary Report on Patentability with translation of Written Opinion issued May 17, 2022 in International Application No. PCT/JP2020/043383.

Decision of Refusal dated Jun. 21, 2022 from the Japanese Patent Office in JP Application No. 2020-036307.

Extended European Search Report issued Oct. 25, 2023 in Application No. 20890404.5.

Extended European Search Report issued Oct. 26, 2023 in Application No. 20890644.6.

Extended European Search Report dated Nov. 8, 2023 in European Application No. 20881003.6.

Decision of Refusal in JP Application No. 2019-210755 issued Nov. 26, 2024.

Notice of Reasons of Refusal in JP Application No. 2019-210755 issued Jun. 11, 2024.

Notice of Reasons of Refusal in JP Application No. 2022-090366 issued Dec. 10, 2024.

Kohji Tashiro et al., "Confirmation of Crystal Structure of Poly(vinylidene fluoride) through the Detailed Structure Analysis of Vinylidene Fluoride Oligomers Separated by Supercritical Fluid Chromatography", Macromolecules 2002, 35, 714-721.

METHOD FOR DETERMINING STRUCTURE OF SUBSTANCE IN MULTICOMPONENT SAMPLE

CROSS-REFERENCE TO RELATED APPLICATIONS

This application is a National Stage of International Application No. PCT/JP2020/040979, filed Oct. 30, 2020, claiming priority based on Japanese Patent Application No. 2019-200020, filed Nov. 1, 2019, and Japanese Patent Application No. 2020-014066, filed Jan. 30, 2020.

TECHNICAL FIELD

The present invention relates to a method of determining the structure of a substance in a multicomponent sample.

BACKGROUND ART

Qualitative analysis of a multicomponent sample is prevalent in industries including, for example, pharmaceutical, food, cosmetic, and material engineering industries and is an essential process for research and development or for product development. The qualitative analysis of a multicomponent sample comprises the steps of isolating a chemical substance of interest from multiple components and determining the structure or identification of the isolated chemical substance, and is generally difficult to be performed. Techniques for isolating a chemical substance include, for example, gas chromatography (GC), high-performance liquid chromatography (HPLC), and capillary electrophoresis. In GC, target samples of analysis are limited to thermostable volatile compounds though results with higher resolution are provided. In capillary electrophoresis, target samples of analysis are limited to water-soluble ionic compounds. HPLC is widely used as a technique for isolating a chemical substance in a multicomponent sample because of fewer limitations with respect to target samples of analysis than those in the above-described techniques.

In recent years, supercritical fluid chromatography (SFC) has been attracting attention as a technique for isolating a chemical substance in a multicomponent sample. SFC uses carbon dioxide in a supercritical fluid state as the mobile phase, and this allows for significant reduction in the amount of an organic solvent used for the mobile phase compared with that used in HPLC and also attracts attention to SFC as a separation and analysis technique giving less burden to the environment, from the viewpoint of filling social needs of establishing a low-carbon society. Moreover, SFC can not only provide high-resolution separation and high-speed analysis but also isolate a wide variety of polar chemical substances, ranging from low-polarity compounds, such as volatile compounds, which are ideal samples for GC, to high-polarity compounds that are to be analyzed by HPLC (Non-Patent Documents 1 to 3). Furthermore, SFC also provides excellent separation and analysis of enantiomers when combined with a chiral column (Non-Patent Document 4).

In the step of identifying an isolated chemical substance in the qualitative analysis of a multicomponent sample, a combination of gas chromatography (GC) and a detector for ELMS can provide MS spectral information regarding to the isolated chemical substance, and the chemical substance can often be identified by comparing the MS spectrum of the isolated chemical substance to the spectra of compounds recorded in a library because the MS spectral data of frequently detected known components is stored in the library. However, the above method can neither identify a chemical substance unregistered in the library, such as that of a novel compound, nor determine the absolute configuration of an enantiomer. In general, HPLC is combined with a detector for APCI-MS or ESI-MS, and the difference in principle of ionization for the MS techniques results in generation of different patterns of fragment ions depending on the type of a detector used and on measurement conditions. Thus, the information obtained is so limited that a chemical substance is not identified by HPLC-MS as easily as by GC-EI/MS. Accordingly, HPLC-NMR, in which NMR is incorporated as a detector, has been in practical use. This technique is low in sensitivity and is high in cost because of the necessity of a deuterated solvent for the mobile phase but has potential to estimate the structure of an unknown chemical substance. In contrast, SFC has not been practically used in combination either with a detector for ELMS or with NMR and shows lower performance in identification of an isolated chemical substance than GC or HPLC.

As seen above, there still remains a room for improvement in qualitative analysis of multicomponent samples containing various chemical substances.

REFERENCE LIST

Non-Patent Documents

Non-Patent Document 1: J. Chromatogr. A, 2012, 1266, 143-148.

Non-Patent Document 2: J. Agric. Food Chem., 2015, 63(18), 4457-4463.

Non-Patent Document 3: J. Chromatogr. A, 2014, 1362, 270-277.

Non-Patent Document 4: Anal. Chim. Acta, 2014, 821, 1-33.

SUMMARY OF THE INVENTION

An object of the present invention is to provide a novel method for determining the structure of a substance in a multicomponent sample.

The inventors made efforts to study a method of identifying a target substance in a multicomponent sample and consequently found that supercritical fluid chromatography (hereinafter sometimes referred to simply as "SFC") can be used in combination with the crystalline sponge (hereinafter sometimes referred to simply as "CS") method for isolating a target substance from a multicomponent sample and for identifying the isolated substance and also for determining the absolute configuration or identification of an enantiomer, which is beyond the ability of MS or NMR. The inventors also found that analytical-scale SFC with a column of 4.6 mm or less in internal diameter can be used in combination with the CS method to determine the structure, including the absolute configuration, of a target substance, and further found that a solvent used for the mobile phase of SFC (including a modifier solvent and a make-up solvent) can be changed to a solvent applicable to the crystalline sponge method to allow the separation step by SFC and the structure determination step by the CS method to be performed sequentially on line. The inventors further found a combination of a solvent used for the mobile phase of SFC and a crystalline sponge resistant to the solvent. The present invention is based on the above findings.

The present invention provides the following inventions.

[1] A method of determining the structure of a target substance contained in a mixture of two or more substances, the method comprising the steps of: (A) isolating the target substance from the mixture by means of supercritical fluid chromatography; (B) soaking the isolated target substance into a crystalline sponge to produce a sample for crystallography, and (C) performing a crystallographic analysis on the sample for crystallography.

[2] The method according to [1], wherein, in the step (A), a volatile solvent is used as a mobile phase in the supercritical fluid chromatography.

[3] The method according to [2], further comprising the step of evaporating the volatile solvent in the isolated target substance after the step (A) and before the step (B).

[4] The method according to any of [1] to [3], wherein the steps (A), (B), and (C) are performed sequentially.

[5] The method according to [4], wherein the solvent used as a mobile phase in the supercritical fluid chromatography of the step (A) is a solvent which can be used for the soaking into a crystalline sponge in the step (B).

[6] The method according to [4] or [5], wherein a device for performing the step (A) and a device for performing the step (B) are seamlessly connected together to perform the steps (A), (B), and (C).

[7] The method according to any of [1] to [6], wherein the target substance contained in the mixture has an octanol-water partition coefficient (log $P_{ow}$) of not less than −4.6.

[8] The method according to any of [1] to [7], wherein the target substance is an enantiomer.

An advantage of the method of the invention is that the method can quickly and precisely determine the structure (particularly, the absolute configuration) of a target substance in a multicomponent sample (particularly, a mixture of various polar compounds), which is difficult to be analyzed.

DETAIL DESCRIPTION OF THE INVENTION

Figure 1:
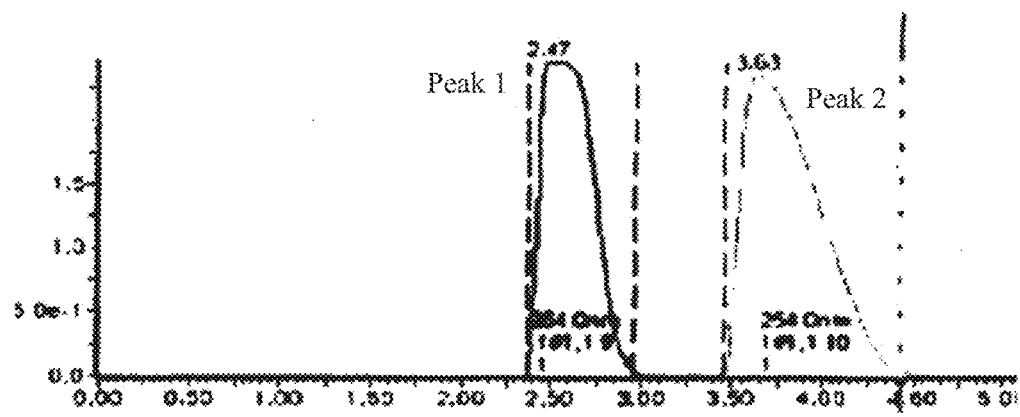
FIG. 1 shows a result (chromatogram) from analyzing a racemic sample, omeprazole, by SFC.

The invention is a method of determining the structure of a target substance contained in a multicomponent sample, or in a mixture of two or more substances. The target substance of analysis for structure determination is not specifically limited, provided that the substance can be isolated by the step (A) and be analyzed for structural features by the step (C). However, the analysis for structure determination mainly targets organic compounds and also targets peptides, nucleic acids, and the like.

The method of the invention comprises the steps of: (A) isolating a target substance from a mixture of two or more substances by means of supercritical fluid chromatography (SFC); (B) soaking the isolated target substance into a crystalline sponge (CS) to produce a sample for crystallography; and (C) performing a crystallographic analysis on the sample for crystallography.

In the step (A), SFC is used to isolate the target substance for structure determination from the mixture and to collect a solution containing the target substance. A wide variety of polar substances, ranging from volatile or highly hydrophobic compounds to hydrophilic compounds, can be isolated by the SFC method, and basic operations of SFC are known. The target substance can be isolated and collected according to routine procedures of SFC and high-performance liquid chromatography (HPLC). The target substance can be isolated and collected using a commercially available device for SFC according to the operating manual of the device.

In many cases, a blend of carbon dioxide and a solvent called modifier for adjusting the separation of compounds is used as the mobile phase of SFC. A volatile organic solvent, a volatile acid, or a volatile base is often used as the modifier. A target substance isolated by SFC is collected by fractionation, while the carbon dioxide in the mobile phase is vaporized. Thus, the target substance dissolved in the modifier solvent is collected in a fraction collector or the like. A make-up solvent is a solvent that is added separately during a period when the target substance is isolated by column chromatography and collected in a fraction collector or the like, and the make-up solvent is added for the purpose of increasing the solubility of the target substance or other purposes. The collected target substance may be dissolved in the modifier solvent or in a mixed solvent of the modifier solvent and the make-up solvent.

The mixture that is subjected to SFC in the step (A) contains two or more substances, and the form of the mixture is not specifically limited as long as the mixture contains two or more substances. Examples of the mixture subjected to SFC include food compositions (including beverage compositions), pharmaceutical compositions, healthcare compositions, oral care compositions, flavors, natural products (for example, food materials such as fruits, vegetables, spices, and herbs) and their extracts, synthetic organic compounds (for example, coating materials, pigments, agrochemicals, pesticides), biological samples (for example, blood, urine, saliva, nasal mucus, biological tissues, organs), environmental samples (for example, river water, lake water, seawater, soil), and enzymatic reaction products. The method of the invention can determine the structure of a substance contained in a multicomponent sample that contains multiple similar substances, so that the method of the invention can be suitably applied to natural products and synthetic organic compounds, which potentially contain similar substances. Moreover, the target substance in the mixture may be a strongly polar substance, for example, and the target substance can be a polar substance with an octanol-water partition coefficient (log $P_{ow}$) of not less than −4.6. In this respect, the octanol-water partition coefficient is defined as the concentration ratio of a compound between two phases of octanol and water ($K_{ow}$), where the compound is dissolved in the octanol phase and in water. In this specification, log $P_{ow}$, the common logarithm of $K_{ow}$, is used as the octanol-water partition coefficient.

In the step (B), the solution containing the target substance collected in the step (A) is soaked into a crystalline sponge to produce a sample for crystallography. In this respect, the crystalline sponge is a single crystal material with regular porous structures and can be made for example from metal-organic frameworks (MOFs), covalent organic frameworks (COFs), porous organic molecular crystals (POMCs), inorganic compounds, such as zeolites, or the like. However, the source of the single crystal material is not limited, provided that a compound is incorporated as a guest into pores of the single crystal material. An example of the crystalline sponge composed of a metal-organic framework is a polymer metal complex with a three-dimensional network structure, which is composed of a ligand with two or more coordination sites and a metal ion as a coordination center. The "three-dimensional network structure" as used herein refers to a network structure composed of repeating structural units, extending in three dimensions, each unit formed by a ligand (a ligand with two or more coordination sites or any of other monodentate ligands) and a metal ion bound thereto. A single crystal metal-organic framework that can be used as a crystalline sponge is described in the following literature: for example, Nature 2013, 495, 461-466; Chem. Commun. 2015, 51, 11252-11255; Science 2016, 353, 808-811; Chem. Commun. 2016, 52, 7013-7015; Chem. Asian J. 2017, 12, 208-211; J. Am. Chem. Soc. 2017, 139, 11341-11344; Chem 2017, 3, 281-289; and JP 5969616 B. A $[(ZnX_2)_3(tpt)_2 \cdot (solvent)_a]_n$-type crystalline sponge (wherein X represents a halogen atom such as chlorine, bromine, iodine, or fluorine, and "tpt" represents 2,4,6-tri(4-pyridyl)-1,3,5-triazine, and "solvent" represents a solvent confined in pores and other structures, and "a" represents a number of not less than 0, and "n" represents a positive integer; the same applies below) described, for example, in Nature 2013, 495, 461-466 and Chem. Commun. 2015, 51, 11252-11255 is preferred in consideration of convenience for single crystal preparation. For the production of a sample for crystallography, the method of soaking the target substance in a crystalline sponge to incorporate the target substance as a guest into pores is not specifically limited, as long as the method allows the target substance as a guest to be incorporated into pores. For example, the target substance can be incorporated as a guest into pores by a method described in the following literature: for example, IUCrJ 2016, 3, 139-151; Chem. Eur. J. 2017, 23, 15035-15040; CrystEngComm, 2017, 19, 4528-4534; Org. Lett. 2018, 20, 3536-3540; Science 2016, 353, 808-811; and Chem. Commun. 2015, 51, 11252-11255.

The presence of water in a crystalline sponge may destroy its own structure, depending on the type of the crystalline sponge. Therefore, the sample containing the target substance collected in the step (A) may be made free of water before proceeding to the step (B). In particular, a $[(ZnX_2)_3(tpt)_2 \cdot (solvent)_a]_n$-type crystalline sponge, which can incorporate various compounds as a guest and shows excellent performance in structure determination should be away from contamination with water, because the crystal structure of the sponge is destroyed in an environment containing water as a solvent. Advantageously, a volatile mobile phase is used throughout the separation procedure in SFC, as described above, and a portion of or all the volatile solvent is evaporated from the fraction containing the target substance collected in the step (A), immediately before the resulting fraction is used for the production of a sample for crystallography in the step (B).

In other words, a volatile solvent (preferably a volatile solvent not containing water) is preferred as the mobile phase of SFC used in the step (A) of the method of the invention. The method of the invention may comprise the step of evaporating a portion of or all the volatile solvent from the isolated target substance after the step (A) and before the step (B). Additionally, an appropriate solvent may be added in the step (B) to adjust the concentration of the target substance. The inclusion of such a step provides an advantage to the method of the invention in that the steps (A), (B), and (C) can be performed sequentially. In this respect, the phrase "performed sequentially" means on-line performance of the steps (A), (B), and (C) by a connection of devices for performing SFC and the CS method, as well as sequential off-line performance of those steps.

In the sequential performance as described above, a solvent that can be used for the soaking into a crystalline sponge in the step (B) may be used as the solvent (including the modifier solvent and the make-up solvent) used for the mobile phase of SFC in the step (A). That is, the solvent used for the step (A) may be the same as the solvent used for the step (B) or can be selected to be a solvent that has no adverse effects on a crystalline sponge (for example, not causing destruction or dissolution of a crystalline sponge) when the solvent is different from the solvent used for the step (B). For example, as described in examples below (Examples 5 to 20), vials containing a crystalline sponge soaked in a solvent may be prepared prior to the step (B), and a substance isolated by a SFC device is collected directly into the vials together with a solvent used as the mobile phase of SFC. In this case, the step of evaporating a portion of or all the volatile solvent from the isolated target substance after the step (A) and before the step (B) can be omitted, which advantageously allows seamless connection of a device for performing the step (A) to that for performing the step (B) and quick analysis of the structure of the target substance. In particular, a volatile compound is so prone to be lost by volatilization that the structure of the compound is difficult to be analyzed from a tiny amount of the sample. Extremely advantageously, the seamless connection of a device for performing the step (A) to that for performing the step (B) allows for isolation of a compound from a mixture as a target of analysis and subsequent incorporation of the compound into pores of a crystalline sponge, which enables structural analysis of the compound in a tiny amount of the sample without loss by volatilization.

As examples of the solvent that has no adverse effects on a crystalline sponge, hydrocarbons, such as n-hexane, cyclohexane, benzene, and toluene, and ethers, such as methyl tert-butyl ether (MTBE) and dimethoxyethane (DME), and esters, such as ethyl acetate, ketones, such as acetone and 2-butanone, and carbon dioxide in a supercritical, subcritical, gaseous, or liquid state are suitable for $[(ZnCl_2)_3(tpt)_2 \cdot$ (n-hexane)$_a$]$_n$-type crystalline sponges, and alcohols, such as methanol, ethanol, propanol, and isopropanol, as well as hydrocarbons, ethers, esters, ketones, and carbon dioxide as described above, are suitable for [CuBr(btt)]-type crystalline sponges, and nitriles, such as acetonitrile, as well as hydrocarbons, ethers, esters, ketones, carbon dioxide, and alcohols as described above, are suitable for [Co$_2$(R-man)$_2$(bpy)$_3$](NO$_3$)$_2$-type and [Co$_2$(S-man)$_2$(bpy)$_3$](NO$_3$)$_2$-type crystalline sponges. In addition, the above solvents that have no adverse effects on crystalline sponges may be mixed in any combination or ratio.

In the step (C), the sample for crystallography produced in the step (B) can be analyzed by crystallography to determine the molecular structure of the target substance. Any technique selected from X-ray diffraction, neutron diffraction, and electron diffraction may be used for the crystallographic analysis. Additionally, the measurement data, or the structure of the target substance, can be analyzed by a known method. For example, the steps (B) and (C) can be performed as described in WO 2014/038220 or in IUCrJ 2016, 3, 139-151.

Advantageously, the method of the invention can quickly and precisely determine the structure of a target substance in a multicomponent sample, which is difficult to be analyzed. Even if the target substance is a mixture of isomers, these isomers can be separated to identify and determine the structure of each isomer. Isomers include structural isomers and stereoisomers, and structural isomers include positional isomers and the like, and stereoisomers include conformational isomers and configurational isomers. Moreover, configuration isomers includes optical isomers (enantiomers) and diastereoisomers (diastereomers). In enantiomeric compounds, such as active ingredients, candidates for active ingredients, seasoning ingredients, or flavoring ingredients, in pharmaceutical products or foods with functional claims, only one of the enantiomers may function as an active ingredient. Extremely advantageously, the method of the invention can quickly and precisely determine the absolute configuration of each compound contained in a multicomponent sample.

EXAMPLES

The present invention will be specifically described in more detail by examples below, but the present invention is not limited to those examples.

Example 1

Separation of Enantiomers in a Racemic Sample by SFC (1)

In Example 1, a preparative SFC device suitable for use of a column with an internal diameter of not less than 10 mm was used to separate enantiomers in a racemic sample.

(1) Method

As the racemic sample, omeprazole (Tokyo Chemical Industry Co., Ltd.), which is an active ingredient in a commercially available pharmaceutical product and is obtainable as a general reagent, was used. Omeprazole (racemate) was prepared at a concentration of 10 mg/mL in methanol, and subjected to supercritical fluid chromatography (SFC) (Waters Thar Supercritical Fluid Chromatography System; Waters Corporation) under the following conditions.

TABLE 1

Conditions for SFC

| | |
|---|---|
| Column | CHIRALCEL IC 10 mm i.d. × 250 mm (particle size: 5 μm) |
| Column temperature | 40° C. |
| Mobile phase A | CO$_2$ |
| Mobile phase B | MeOH |
| Mobile phase mixture ratio | A:B = 70:30 (isocratic) |
| Flow rate | 30 mL/min |
| Detection | UV 254 nm |
| Injection volume | 1.5 mL |
| Sample concentration | 10 mg/mL |
| Analysis time | 7 minutes |

(2) Result

The result of the analysis, a chromatogram, under the above conditions was as shown in FIG. 1. The two enantiomers of omeprazole were separated with a resolution as high as 10.5 within 5 minutes.

Example 2

Determination of Absolute Configuration by the CS Method (1)

In Example 2, the absolute configuration was determined by the CS Method for each of the two enantiomers of the racemic compound which were separated and collected in Example 1.

(1) Method

The components corresponding to the two peaks (Peak 1 and Peak 2) shown in FIG. 1 for Example 1 were separately collected, and a portion of each collection (equivalent to 40 μg) was transferred into a 1.2-mL V-bottom vial, and an eluent, methanol (MeOH), was evaporated under nitrogen gas flow. Subsequently, one granule of a crystalline sponge (a size of 100 μm×100 μm×100 μm multiplied by a density of 1.3 g/cm$^3$ gives a theoretical weight of 1.3 μg) and 20 μL of a mixed solvent of methyl t-butyl ether (MTBE) and dimethoxyethane (DME) (9:1 by volume) were added together to each vial. After the vials were capped and incubated at 50° C. for 1 day, the crystalline sponge was recovered from each vial and analyzed by a single crystal X-ray diffractometer (Cu Kα λ, =1.5418 Å).

A [(ZnCl$_2$)$_3$(tpt)$_2$·(n-hexane)$_a$]$_n$-type crystalline sponge produced by the method described in Chem. Eur. J. 2017, 23, 15035-15040 was used as the crystalline sponge. The crystalline sponge was stored with being immersed in n-hexane until before use, and the solvent was exchanged with the above MTBE/DME mixed solvent just before use, and the resulting crystalline sponge was then used for the experiment.

The measurement data was analyzed according to the method described in Chem. Eur. J. 2017, 23, 15035-15040.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 1 for Example 1 is shown in Table 2.

TABLE 2

Crystallographic Data

| | Peak 1 | Peak 2 |
|---|---|---|
| Formula in the asymmetric unit | $C_{110.48}H_{131.48}C_{112}N_{25.50}O_{13.49}S_{0.50}Zn_6$ | $C_{110.45}H_{131.45}C_{112}N_{25.49}O_{13.48}S_{0.50}Zn_6$ |
| Molecular weight | 2866.04 | 2865.43 |
| Crystal color and habit | yellow and blocky | yellow and blocky |
| Crystal system | Monoclinic | Monoclinic |
| a (Å) | 32.9454 (2) | 33.0111 (2) |
| b (Å) | 14.46490 (10) | 14.45920 (10) |
| c (Å) | 31.1401 (2) | 31.1588 (2) |
| β (°) | 100.5690 (10) | 100.6490 (10) |
| V (Å$^3$) | 14588.11 (17) | 14616.39 (17) |
| Z | 4 | 4 |
| Measurement temperature (K) | 100 (2) | 100 (2) |
| density (g · cm$^{-3}$) | 1.305 | 1.302 |
| Crystal dimensions (μm$^3$) | 0.157 × 0.222 × 0.310 | 0.097 × 0.136 × 0.374 |
| θ range for data collection | 0.729 < θ < 76.607 | 2.724 < θ < 76.906 |
| Linear absorption coefficient (mm$^{-1}$) | 3.664 | 3.657 |
| Space group | C2 | C2 |
| Rint | 0.0271 | 0.0311 |
| R$_1$ | 0.0498 | 0.0494 |
| wR$_2$ | 0.1562 | 0.1557 |
| Number of parameters | 2010 | 2010 |
| Number of restraints | 1137 | 1137 |
| Highest electron density (eÅ$^{-3}$) | 0.70 | 0.70 |
| Lowest electron density (eÅ$^{-3}$) | −0.38 | −0.41 |
| GoF | 1.024 | 1.024 |
| Flack parameter (Parsons) | 0.073 (5) | 0.079 (6) |

Figure 2:
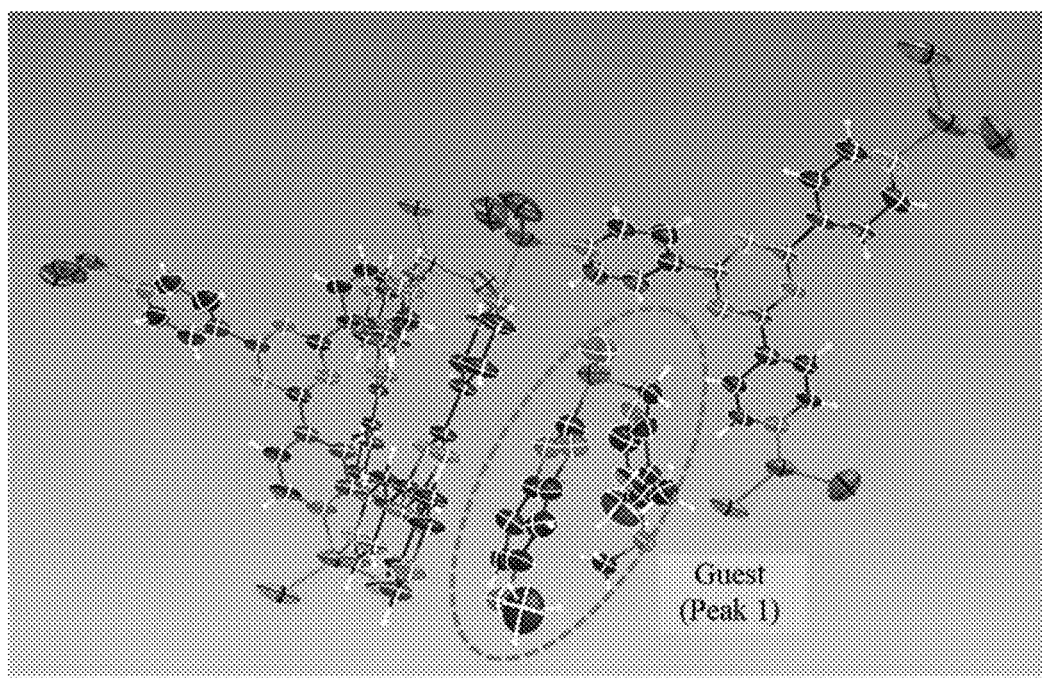
FIG. 2 shows a result (in the asymmetric unit; solvent molecules are omitted) from crystallographic analysis of a crystalline sponge that has incorporated the fraction corresponding to the peak 1 in FIG. 1.
Figure 3:
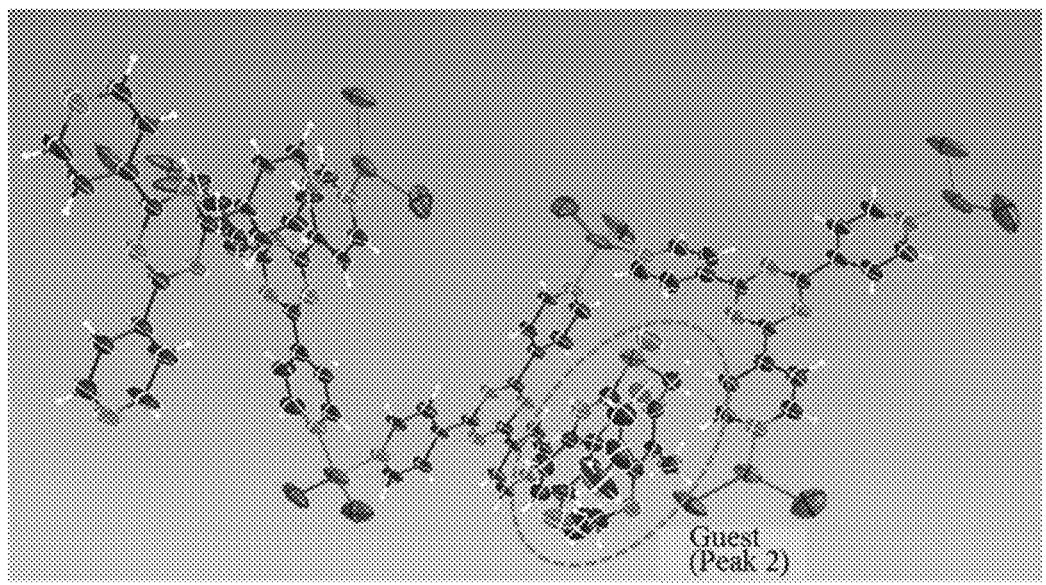
FIG. 3 shows a result (in the asymmetric unit; solvent molecules are omitted) from crystallographic analysis of a crystalline sponge that has incorporated the fraction corresponding to the peak 2 in FIG. 1.
Figure 4:
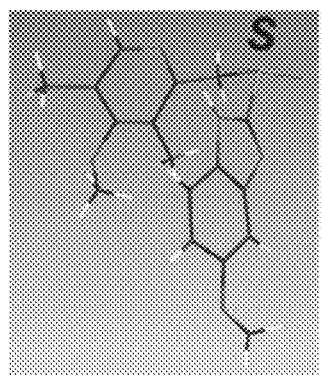
FIG. 4 shows the structure of a guest corresponding to the peak 1 in FIG. 1 identified by the CS method.
Figure 4:
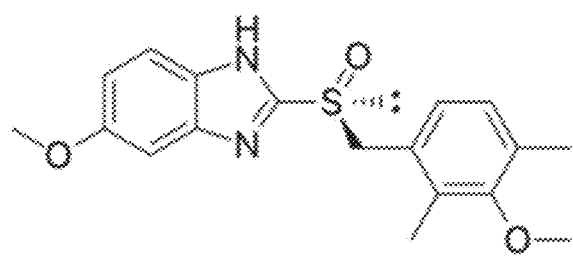
Figure 5:
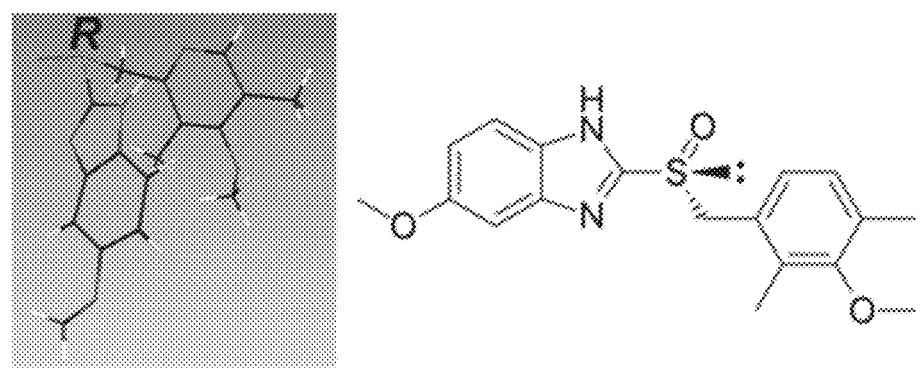
FIG. 5 shows the structure of a guest corresponding to the peak 2 in FIG. 1 identified by the CS method.

Crystal structures of the asymmetric unit for the crystalline sponges that have incorporated the compounds eluted as Peak 1 and Peak 2 are shown in FIGS. 2 and 3, respectively. Each molecule enclosed by the dotted line indicates the guest incorporated in the crystalline sponge. Additionally, the structures of only the observed guests are shown in FIGS. 4 and 5, respectively. From these results, the enantiomers corresponding to Peak 1 and Peak 2 were determined and identified to be the S- and R-isomers of omeprazole, respectively.

Example 3

Separation of Enantiomers in a Racemic Sample by SFC (2)

In Example 3, enantiomers in a racemic sample were separated using an analytical-scale SFC device (Shimadzu Nexera UC; Shimadzu Corporation) suitable for use of a column with an internal diameter of not more than 4.6 mm together with a fraction collector (FRC-40 SF; Shimadzu Corporation).

(1) Method

As a sample of a racemic natural product, rac-(4R,5R)-3,5-dihydroxy-4-(3-methylbut-2-en-1-yl)-2-(3-methylbutanoyl)cyclopent-2-en-1-one (this compound can be tautomerized to a compound with the structure of rac-(4R,5R)-3,4-dihydroxy-5-(3-methylbut-2-en-1-yl)-2-(3-methylbutanoyl)cyclopent-2-en-1-one) was prepared according to the method described in J. Inst. Brew. 1990, 96, 137-141. This racemic compound was prepared in methanol at a concentration of 86 mg/mL and subjected to SFC under the conditions described in Table 3. The Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 3

Conditions for SFC

| | |
|---|---|
| Column | CHIRALPAK IG 4.6 mm i.d. × 250 mm (particle size: 5 μm) |
| Column temperature | 25° C. |
| Mobile phase A | $CO_2$ |
| Mobile phase B | MeCN/MeOH/TFA = 70/30/0.5 (v/v/v) |
| Make-up solvent | MeOH (5 mL/min) |
| Mobile phase mixture ratio | A:B = 70:30 (isocratic) |
| Flow rate | 2 mL/min |
| Detection | UV 270 nm |
| Pressure | 10 MPa |
| Injection volume | 5 μL |
| Sample concentration | 86 mg/mL |
| Analysis time | 10 minutes |

MeCN: acetonitrile,
MeOH: methanol,
TFA: trifluoroacetic acid (2) Result

Figure 6:
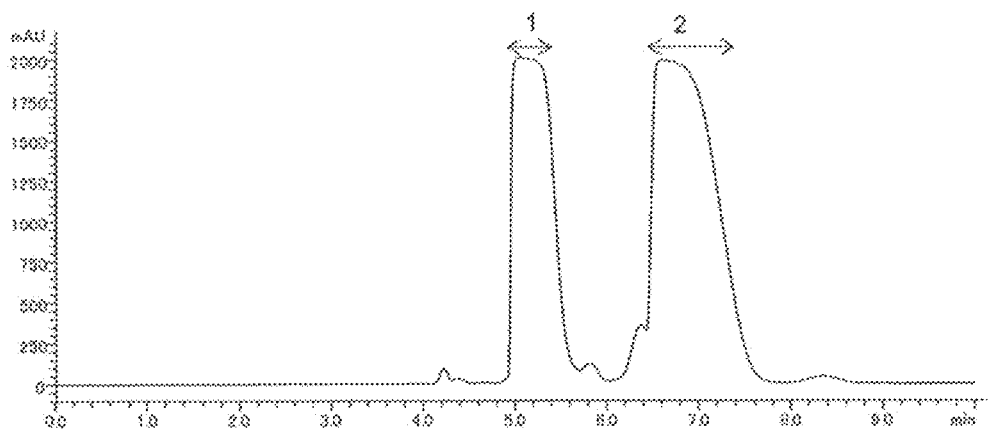
FIG. 6 shows a result (chromatogram) from analyzing a racemic sample, rac-(4R,5R)-3,5-dihydroxy-4-(3-methylbut-2-en-1-yl)-2-(3-methylbutanoyl)cyclopent-2-en-1-one, by SFC.

The result of the analysis, a chromatogram, under the above conditions was as shown in FIG. 6. The two enantiomers of this racemic compound were separated with a resolution of 2.0 within 10 minutes.

Example 4

Determination of Absolute Configuration by the CS Method (2)

In Example 4, the absolute configuration was determined by the CS Method for each of the two enantiomers of the racemic compound which were separated and collected in Example 3.

(1) Method

The components corresponding to the two peaks (Peak 1 and Peak 2) shown in FIG. 6 for Example 3 were separately collected, and a portion of each collection (approximately 1/40 of the volume collected at one time, equivalent to 5 μg) was transferred into a 1.2-mL V-bottom vial, and an eluent, a mixed solution of the mobile phase B and the make-up solvent (composed of methanol, acetonitrile, and trifluoroacetic acid), was evaporated under nitrogen gas flow. Subsequently, one granule of a crystalline sponge (a size of 100 μm×100 μm×100 μm multiplied by a density of 1.3 g/cm$^3$ gives a theoretical weight of 1.3 μg) and 50 μL of n-hexane were added together to each vial. The vials were capped, and each cap was pierced with an injection needle, and the vials were incubated at 50° C. to gently evaporate the solvent. One day later, the crystalline sponge was recovered from each vial and analyzed by a single crystal X-ray diffractometer (Cu Kα λ, =1.5418 Å).

A $[(ZnCl_2)_3(tpt)_2 \cdot (n\text{-hexane})_a]_n$-type crystalline sponge produced by the method described in Chem. Eur. J. 2017, 23, 15035-15040 was used as the crystalline sponge. The crystalline sponge was stored with being immersed in n-hexane until before use.

The measurement data was analyzed according to the method described in Chem. Eur. J. 2017, 23, 15035-15040.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 6 for Example 3 is shown in Table 4.

TABLE 4

| Crystallographic Data | | |
|---|---|---|
| | Peak 1 | Peak 2 |
| Crystal system | Monoclinic | Monoclinic |
| a (Å) | 31.81064 (9) | 31.69595 (14) |
| b (Å) | 14.45533 (3) | 14.39303 (5) |
| c (Å) | 31.62942 (10) | 31.06937 (16) |
| β (°) | 99.6053 (3) | 98.3166 (5) |
| V (Å$^3$) | 14340.36 (7) | 14024.82 (11) |
| Measurement temperature (K.) | 100.0 (1) | 100.0 (1) |
| Z | 4 | 4 |
| Space group | C2 | C2 |
| Rint | 0.0194 | 0.036 |
| R$_1$ | 0.0447 | 0.0578 |
| wR$_2$ | 0.1395 | 0.1688 |
| GoF | 1.108 | 1.058 |
| Flack parameter (Parsons) | 0.064 (4) | 0.072 (9) |

Figure 7:
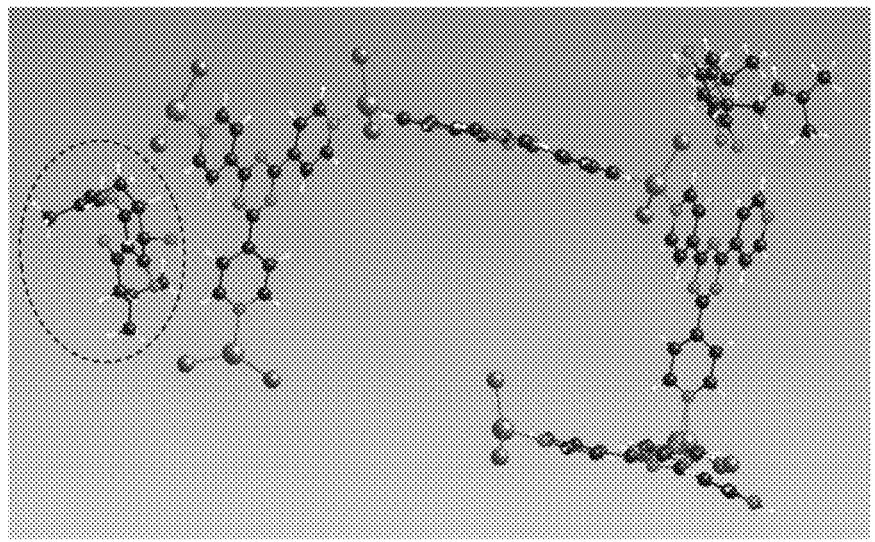
FIG. 7 shows a result (in the asymmetric unit; solvent molecules are omitted) from crystallographic analysis of a crystalline sponge that has incorporated the fraction corresponding to the peak 1 in FIG. 6.
Figure 8:
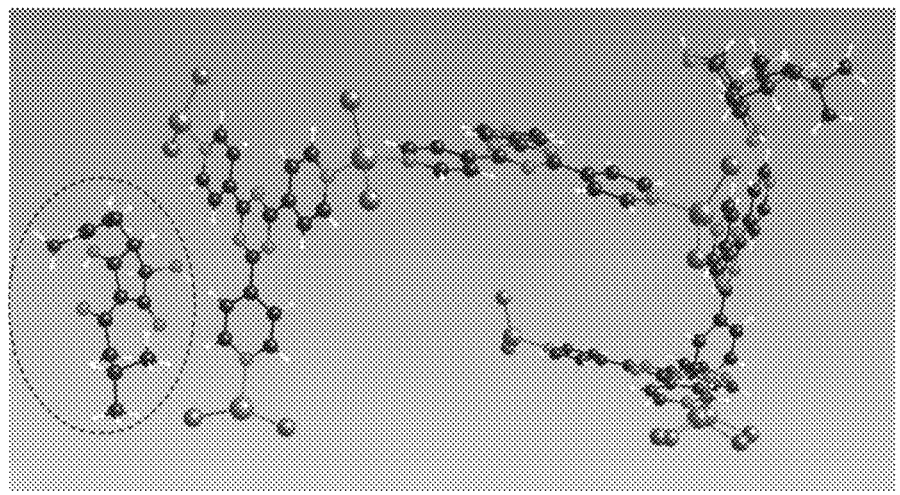
FIG. 8 shows a result (in the asymmetric unit; solvent molecules are omitted) from crystallographic analysis of a crystalline sponge that has incorporated the fraction corresponding to the peak 2 in FIG. 6.
Figure 9:
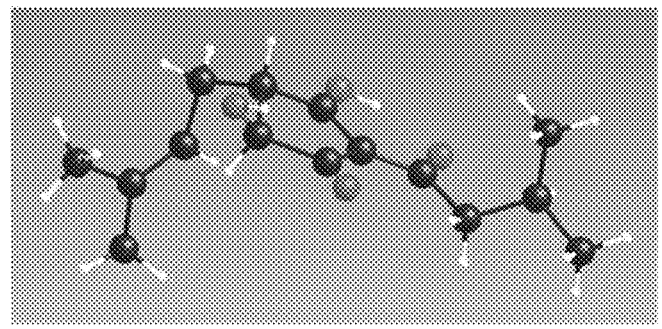
FIG. 9 shows the structure of a guest corresponding to the peak 1 in FIG. 6 identified by the CS method.
Figure 10:
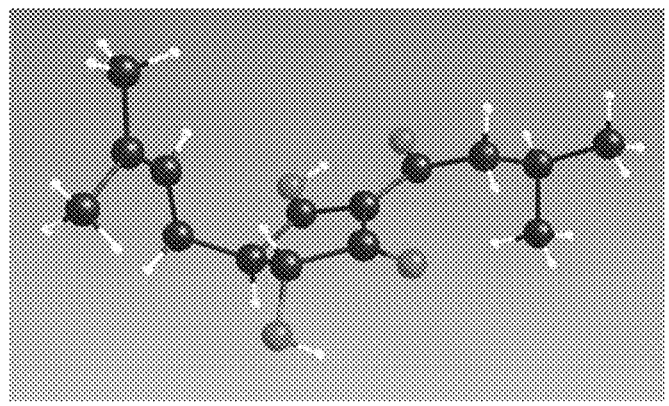
FIG. 10 shows the structure of a guest corresponding to the peak 2 in FIG. 6 identified by the CS method.

Crystal structures of the asymmetric unit for the crystalline sponges that have incorporated the compounds eluted as Peak 1 and Peak 2 are shown in FIGS. 7 and 8, respectively. Each molecule enclosed by the dotted line indicates the guest incorporated in the crystalline sponge. Additionally, the structures of only the observed guests are shown in FIGS. 9 and 10, respectively. From these results, the enantiomers corresponding to Peak 1 and Peak 2 were determined and identified to be (4S,5S)-3,5-dihydroxy-4-(3-methylbut-2-en-1-yl)-2-(3-methylbutanoyl)cyclopent-2-en-1-one and (4R,5R)-3,5-dihydroxy-4-(3-methylbut-2-en-1-yl)-2-(3-methylbutanoyl)cyclopent-2-en-1-one, respectively. The results of Examples 3 and 4 have confirmed that the structure of a target substance can be determined by the method of the invention even in cases where an analytical-scale SFC device is used, that is, the purified target substance has an amount of approximately several tens of μg.

Example 5

Separation of Enantiomers in a Racemic Sample by SFC (3)

In Example 5, enantiomers in a racemic sample were separated using a SFC device and a fraction collector which are the same type of devices as those used in Example 3 and employing an elution solvent identical to that used for the CS method.

(1) Method

As the racemic sample, a racemic mixture of trans-stilbene oxide (Tokyo Chemical Industry Co., Ltd.), which is obtainable as a general reagent, was used. Trans-stilbene oxide (racemate) was prepared in methyl tert-butyl ether (MTBE) at a concentration of 10 mg/mL and subjected to SFC under the conditions described in Table 5. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 5

| Conditions for SFC | |
|---|---|
| Column | CHIRALPAK IC-3 3.0 mm i.d. × 100 mm (particle size: 3 μm) |
| Column temperature | 25° C. |
| Mobile phase A | CO$_2$ |
| Mobile phase B | MTBE |
| Make-up solvent | MTBE (5 mL/min) |
| Mobile phase mixture ratio | A:B = 90:10 (isocratic) |
| Flow rate | 3 mL/min |
| Detection | UV 250 nm |
| Pressure | 10 MPa |
| Injection volume | 2 μL |
| Sample concentration | 10 mg/mL |
| Analysis time | 3 minutes |

Figure 11:
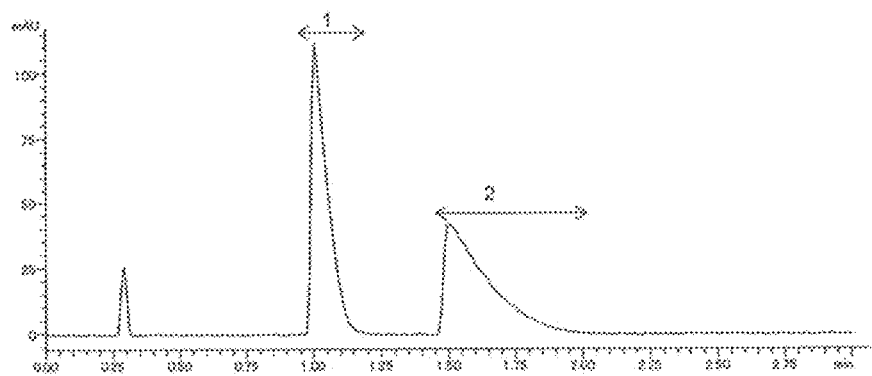
FIG. 11 shows a result (chromatogram) from analyzing a racemic sample, trans-stilbene oxide, by SFC.

The result of the analysis, a chromatogram, under the above conditions was as shown in FIG. 11. The two enantiomers of this racemic compound were separated with a resolution of 2.4 within 3 minutes.

Example 6

Determination of Absolute Configuration by the CS Method (3)

In Example 6, the absolute configuration was determined by the CS method for each of the two enantiomers of the racemic compound which were separated and collected in Example 5.

(1) Method

One granule of a $[(ZnCl_2)_3(tpt)_2 \cdot (n\text{-hexane})_a]_n$-type crystalline sponge produced by the method described in Chem.

Eur. J. 2017, 23, 15035-15040 (a size of 100 μm×100 μm×100 μm multiplied by a density of 1.3 g/cm³ gives a theoretical weight of 1.3 μg) and n-hexane were added to a 1.2-mL V-bottom vial. The solvent inside the crystalline sponge was replaced with methyl tert-butyl ether (MTBE) by removing the n-hexane from and adding 50 μL of MTBE to the vial. Multiple vials prepared as described above were placed in the fraction collector.

The components corresponding to the two peaks (Peak 1 and Peak 2) shown in FIG. 11 for Example 5 were individually collected directly into the above vials containing the crystalline sponge (about 10 μg per peak). After the solvent was evaporated at 50° C. to a volume of about 50 μL, the vials were capped, and each cap was pierced with an injection needle, and the vials were incubated at 50° C. to gently evaporate the remaining solvent. One day later, the crystalline sponge was recovered from each vial and analyzed by a single crystal X-ray diffractometer (Cu Kα λ, =1.5418 Å).

The measurement data was analyzed according to the method described in Chem. Eur. J. 2017, 23, 15035-15040.
(2) Result The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 11 for Example 5 is shown in Table 6.

TABLE 6

Crystallographic Data

|  | Peak 1 | Peak 2 |
|---|---|---|
| Crystal system | Monoclinic | Monoclinic |
| a (Å) | 33.96777 (12) | 33.98936 (19) |
| b (Å) | 14.44849 (4) | 14.44547 (6) |
| c (Å) | 31.66428 (14) | 31.89852 (17) |
| β (°) | 102.7113 (4) | 103.0038 (5) |
| V (Å³) | 15159.41 (10) | 15260.29 (13) |
| Measurement temperature (K.) | 100.0 (1) | 100.0 (1) |
| Z | 4 | 4 |
| Space group | C2 | C2 |
| Rint | 0.0212 | 0.0320 |
| $R_1$ | 0.0719 | 0.0800 |
| $wR_2$ | 0.2278 | 0.2497 |
| GoF | 1.088 | 1.075 |
| Flack parameter (Parsons) | 0.021 (4) | 0.026 (6) |

Figure 12:
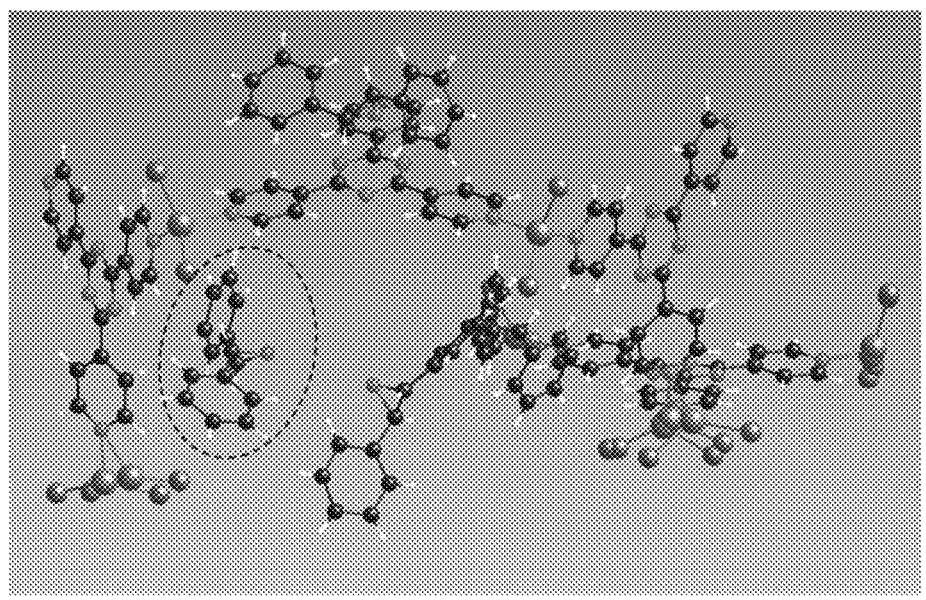
FIG. 12 shows a result (in the asymmetric unit; solvent molecules are omitted) from crystallographic analysis of a crystalline sponge that has incorporated the fraction corresponding to the peak 1 in FIG. 11.
Figure 13:
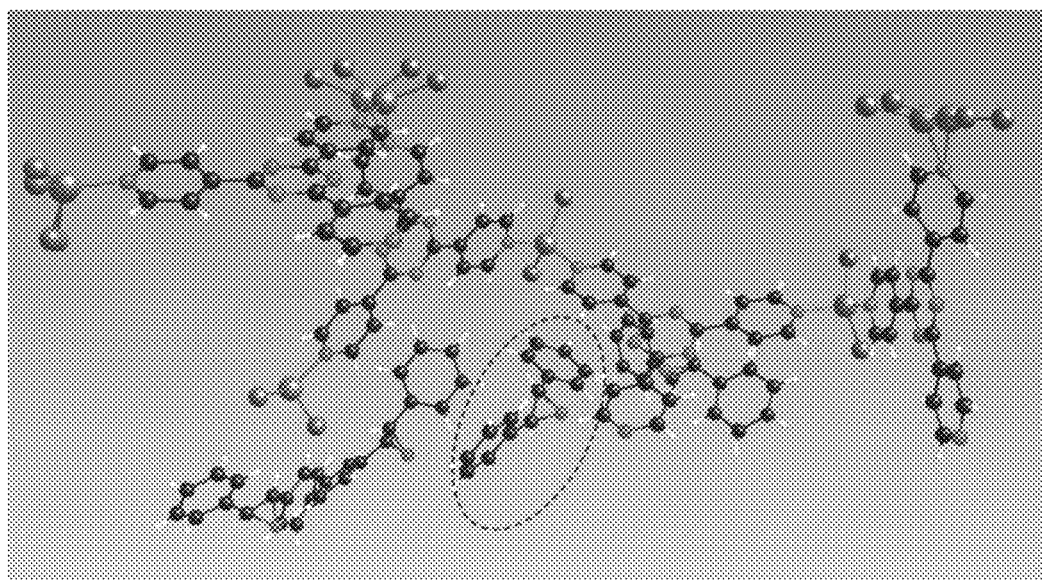
FIG. 13 shows a result (in the asymmetric unit; solvent molecules are omitted) from crystallographic analysis of a crystalline sponge that has incorporated the fraction corresponding to the peak 2 in FIG. 11.
Figure 14:
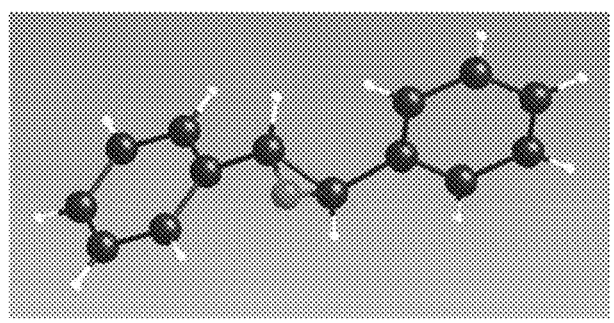
FIG. 14 shows the structure of a guest corresponding to the peak 1 in FIG. 11 identified by the CS method.
Figure 15:
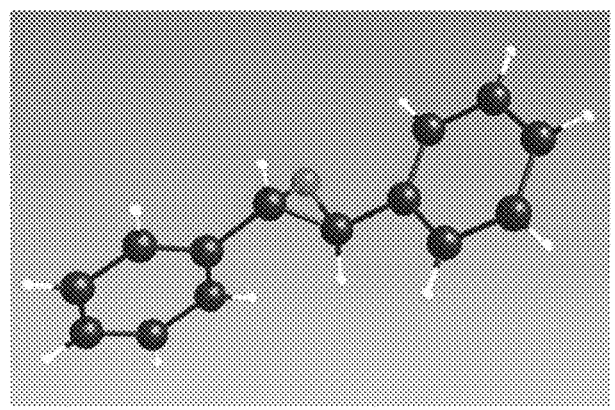
FIG. 15 shows the structure of a guest corresponding to the peak 2 in FIG. 11 identified by the CS method.

Crystal structures of the asymmetric unit for the crystalline sponges that have incorporated the compounds eluted as Peak 1 and Peak 2 are shown in FIGS. 12 and 13, respectively. Each molecule enclosed by the dotted line indicates the guest incorporated in the crystalline sponge. Additionally, the structures of only the observed guests are shown in FIGS. 14 and 15, respectively. From these results, the enantiomers corresponding to Peak 1 and Peak 2 were determined and identified to be the RR isomer of trans-stilbene oxide ((2R,3R)-2,3-diphenyloxirane) and the SS isomer of trans-stilbene oxide ((2S,3S)-2,3-diphenyloxirane). The results of Examples 5 and 6 have confirmed that the structure of a compound can be analyzed by isolating the compound by SFC and collecting the compound directly into a vial containing a crystalline sponge to allow incorporation of the compound.

Example 7

Production of a Methanol-Resistant Crystalline Sponge

Figure 16:
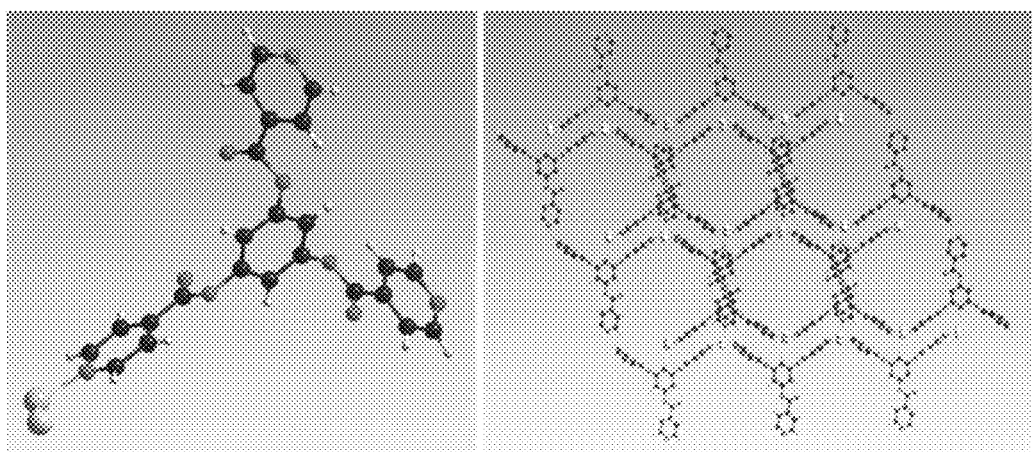
FIG. 16 shows the crystal structure of a [CuBr(btt)]-type crystalline sponge (left: in the asymmetric unit; right: in packing) soaked in methanol for several days.

When methanol was used as an elution solvent for SFC, the $[(ZnCl_2)_3(tpt)_2 \cdot (n\text{-hexane})_a]_n$-type crystalline sponge was found to be labile to methanol, so that seamless performance of SFC and the CS method failed. Then, production of a methanol-resistant crystalline sponge was studied in Example 7.
(1) Method A [CuBr(btt)]-type crystalline sponge was produced by synthesis from benzene-1,3,5-triyl triisonicotinate (btt) and CuBr according to the method described in Chem. Asian J. 2017, 12, 208-211. The crystalline sponge was soaked in methanol for several days, and the crystal structure of the crystalline sponge was then analyzed.
(2) Result Chem. Asian J. 2017, 12, 208-211 reported that a [CuBr(btt)]-type crystalline sponge developed cracks when soaked in methanol, which resulted in failure to obtain a diffraction pattern suitable for analysis. However, the inventors studied hard and consequently found that, surprisingly, the crystal structure of the [CuBr(btt)]-type crystalline sponge produced in this example was precisely measured and observed even after the crystalline sponge was soaked in methanol for several days (FIG. 16).

Example 8

Separation of a Mixed Sample of Positional Isomers by SFC

In Example 8, positional isomers in a mixed sample were separated using a SFC device and a fraction collector which are the same type of devices as those used in Example 3 and employing an elution solvent identical to that used for the CS Method.
(1) Method 1-Acetylnaphthalene (Tokyo Chemical Industry Co., Ltd.) and 2-acetylnaphthalene (Tokyo Chemical Industry Co., Ltd.) were used to prepare a solution containing both of the compounds in methanol (MeOH) at a concentration of 20 mg/mL each as a mixed sample of the positional isomers, and the resulting solution was subjected to SFC under the conditions described in Table 7. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 7

Conditions for SFC

| Column | CHIRALPAK AD-H 4.6 mm i.d. × 250 mm (particle size: 5 μm) |
|---|---|
| Column temperature | 35° C. |
| Mobile phase A | $CO_2$ |
| Mobile phase B | MeOH |
| Make-up solvent | MeOH (3 mL/min) |
| Mobile phase mixture ratio | A:B = 95:5 (isocratic) |
| Flow rate | 3 mL/min |
| Detection | UV 270 nm |
| Pressure | 10 MPa |
| Injection volume | 5 μL |
| Sample concentration | 20 mg/mL |
| Analysis time | 6 minutes |

(2) Result

Figure 17:
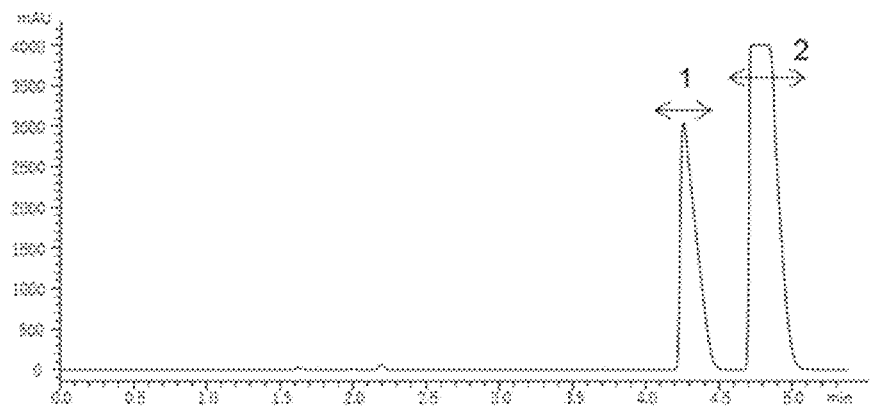
FIG. 17 shows a result (chromatogram) from analyzing a mixed sample of positional isomers by SFC.

The result of the analysis, a chromatogram, under the above conditions was as shown in FIG. 17. The positional isomers (two positional isomeric compounds) in the mixed sample used in this example were separated within 6 minutes.

Example 9

Structure Determination of Positional Isomers by the CS Method

In Example 9, the structure was determined by the CS method using the crystalline sponge produced in Example 7 for each of the two positional isomeric compounds separated and collected in Example 8.

(1) Method

One granule of the [CuBr(btt)]-type crystalline sponge produced in Example 7 (a size of 100 μm×100 μm×100 μm multiplied by a density of 1.5 g/cm³ gives a theoretical weight of 1.5 μg; stored in chloroform until before use) and chloroform were added together to a 1.2-mL V-bottom vial. The solvent inside the crystalline sponge was replaced with methanol by removing the chloroform from and adding 50 μL of methanol to the vial. Multiple vials prepared as described above were placed in the fraction collector.

The components corresponding to the two peaks (Peak 1 and Peak 2) shown in FIG. 17 for Example 8 were individually collected directly into the above vials containing the crystalline sponge (about 100 μg per peak). After the solvent was evaporated at 50° C. to a volume of about 20 μL, the vials were capped and further incubated at 50° C. for 4 days. Four days later, the crystalline sponge was recovered from each vial and analyzed by a single crystal X-ray diffractometer (Cu Kα λ, =1.5418 Å).

The measurement data was analyzed according to the methods described in Chem. Eur. J. 2017, 23, 15035-15040 and in Chem. Asian J. 2017, 12, 208-211.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 17 for Example 8 is shown in Table 8.

TABLE 8

Crystallographic Data

| | Peak 1 | Peak 2 |
|---|---|---|
| Crystal system | Monoclinic | Monoclinic |
| a (Å) | 31.9635 (7) | 30.0915 (10) |
| b (Å) | 7.7800 (1) | 7.71070 (10) |
| c (Å) | 30.6494 (6) | 32.6089 (11) |
| β (°) | 115.897 (3) | 117.332 (4) |
| V (Å³) | 6856.4 (2) | 6721.5 (4) |
| Measurement temperature (K.) | 100.00 (10) | 100.00 (10) |
| Z | 4 | 8 |
| Space group | P2$_1$/c | I2/a |
| Rint | 0.0561 | 0.0301 |
| R$_1$ | 0.0631 | 0.0845 |
| wR$_2$ | 0.1926 | 0.2394 |
| GoF | 1.121 | 1.123 |

Figure 18:
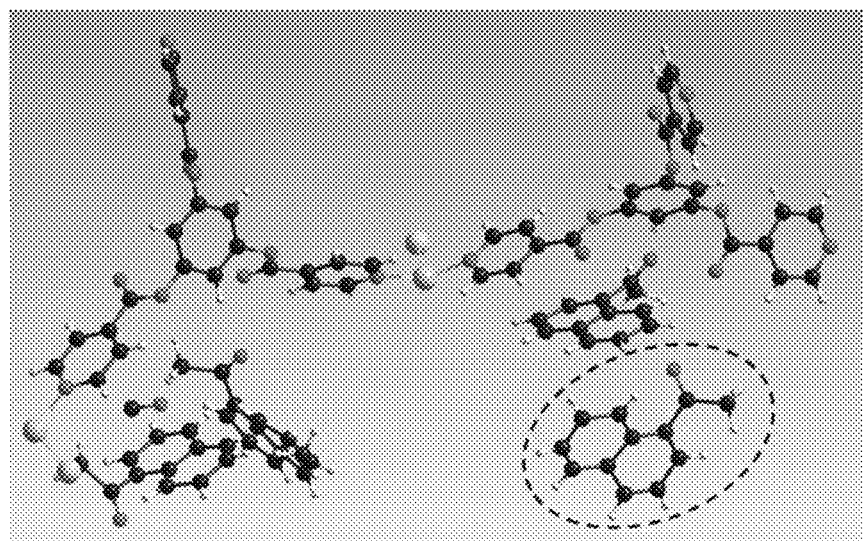
FIG. 18 shows a result (in the asymmetric unit; solvent molecules are omitted) from crystallographic analysis of a crystalline sponge that has incorporated the fraction corresponding to the peak 1 in FIG. 17.
Figure 19:
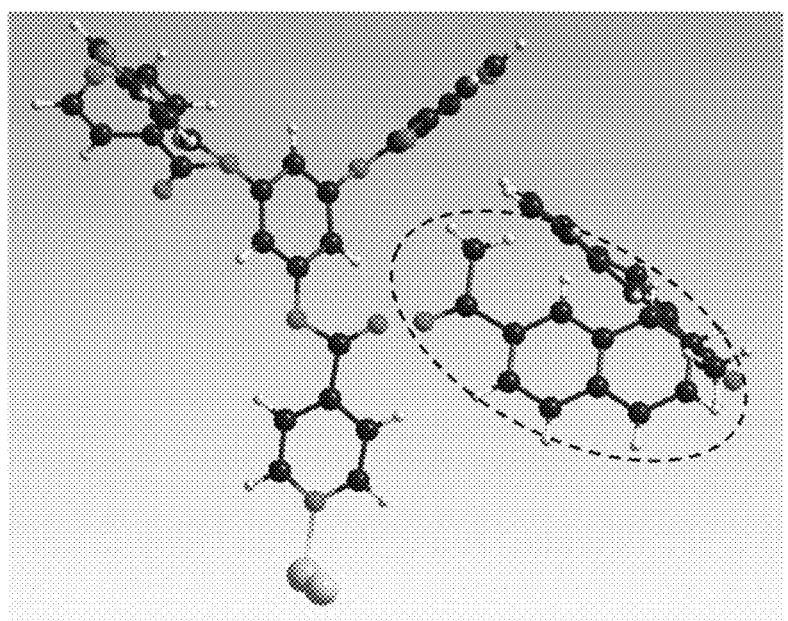
FIG. 19 shows a result (in the asymmetric unit; solvent molecules are omitted) from crystallographic analysis of a crystalline sponge that has incorporated the fraction corresponding to the peak 2 in FIG. 17.
Figure 20:
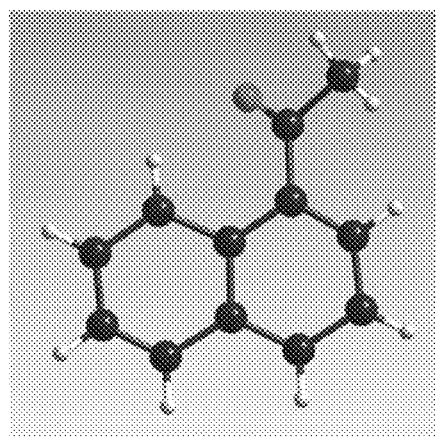
FIG. 20 shows the structure of a guest corresponding to the peak 1 in FIG. 17 identified by the CS method.
Figure 21:
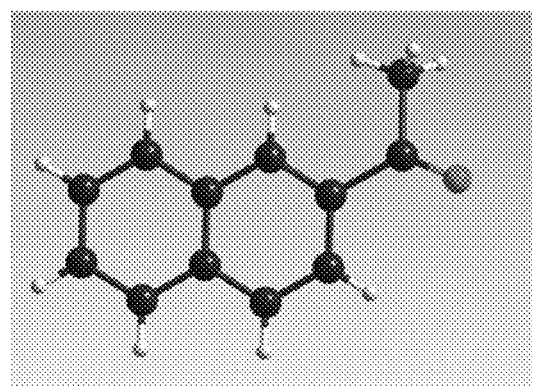
FIG. 21 shows the structure of a guest corresponding to the peak 2 in FIG. 17 identified by the CS method.

Crystal structures of the asymmetric unit for the crystalline sponges that have incorporated the compounds eluted as Peak 1 and Peak 2 are shown in FIGS. 18 and 19, respectively. Each molecule enclosed by the dotted line indicates the guest incorporated in the crystalline sponge. Additionally, the structures of only the observed guests are shown in FIGS. 20 and 21, respectively. From these results, the positional isomers corresponding to Peak 1 and Peak 2 were determined and identified to be 1-acetylnaphthalene and 2-acetylnaphthalene, respectively. The results of Examples 8 and 9 have confirmed that a methanol-resistant crystalline sponge can be used for analysis of the structure of a compound, wherein the compound is isolated by SFC (methanol is contained in the mobile phase) and collected directly into a vial containing the crystalline sponge to allow incorporation of the compound.

Example 10

Production of an Acetonitrile-Resistant Crystalline Sponge

When acetonitrile was used as an elution solvent for SFC, the [(ZnCl$_2$)$_3$(tpt)$_2$·(n-hexane)$_a$]$_n$-type crystalline sponge was found to be labile to acetonitrile, so that seamless performance of SFC and the CS method failed. Then, production of an acetonitrile-resistant crystalline sponge was studied in Example 10.

(1) Method

A [Co$_2$(R-man)$_2$(bpy)$_3$](NO$_3$)$_2$-type crystalline sponge and a [Co$_2$(S-man)$_2$(bpy)$_3$]NO$_3$)$_2$-type crystalline sponge were produced by synthesis from 4,4'-bipyridine (bpy), (S)-mandelic acid (S-man) or (R)-mandelic acid (R-man), and Co(NO$_3$)$_2$ according to the method described in J. Am. Chem. Soc. 2015, 137, 12045-12049. These crystalline sponges were soaked in acetonitrile for several days, and the crystal structures of the crystalline sponges were then analyzed.

(2) Result

Figure 22:
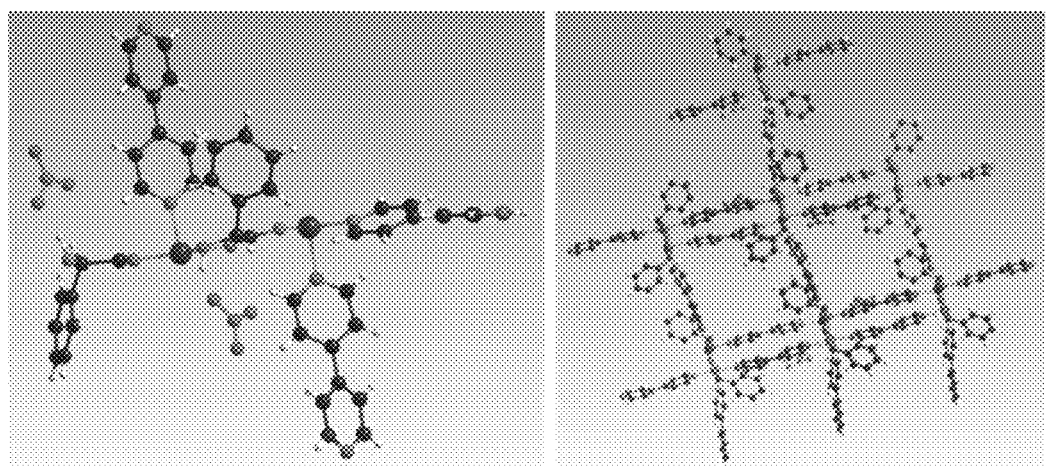
FIG. 22 shows the crystal structure of a $[Co_2(R\text{-man})_2(bpy)_3](NO_3)_2$-type crystalline sponge (left: in the asymmetric unit; right: in packing) soaked in acetonitrile for several days.

The inventors found that the crystal structures of the [Co$_2$(R-man)$_2$(bpy)$_3$](NO$_3$)$_2$-type and [Co$_2$(S-man)$_2$(bpy)$_3$](NO$_3$)$_2$-type crystalline sponges were precisely measured and observed even after the crystalline sponges were soaked in acetonitrile for several days (FIG. 22).

Example 11

Separation of a Mixed Sample of Stereoisomers by SFC

In Example 11, stereoisomers in a mixed sample were separated using a SFC device and a fraction collector which are the same type of devices as those used in Example 3 and employing an elution solvent identical to that used for the CS method.

(1) Method

Rac-hydrobenzoin (Tokyo Chemical Industry Co., Ltd.), which is a mixture containing equal amounts of RR and SS isomers, and meso-hydrobenzoin (Tokyo Chemical Industry Co., Ltd.) were used to prepare a solution containing both of the compounds in acetonitrile (MeCN) at concentrations of 20 mg/mL (the concentration of the racemate) and 10 mg/mL, respectively, as a mixed sample of the stereoisomers, and the resulting solution was subjected to SFC under the conditions described in Table 9. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 9

Conditions for SFC

| | |
|---|---|
| Column | CHIRALPAK IG 4.6 mm i.d. × 250 mm (particle size: 5 μm) |
| Column temperature | 35° C. |
| Mobile phase A | $CO_2$ |
| Mobile phase B | MeCN |
| Make-up solvent | MeCN(0.3 mL/min) |
| Mobile phase mixture ratio | A:B = 40:60 (isocratic) |
| Flow rate | 4 mL/min |
| Detection | UV 270 nm |
| Pressure | 10 MPa |
| Injection volume | 10 μL |
| Sample concentration | rac-hydrobenzoin (20 mg/mL), meso-hydrobenzoin (10 mg/mL) |
| Analysis time | 5 minutes |

(2) Result

Figure 23:
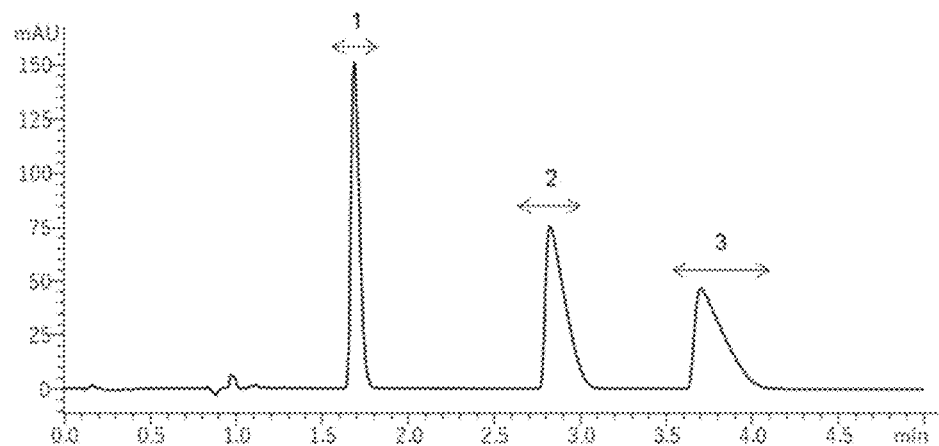
FIG. 23 shows a result (chromatogram) from analyzing a mixed sample of stereoisomers by SFC.

The result of the analysis, a chromatogram, under the above conditions was as shown in FIG. 23. The stereoisomers (three stereoisomeric compounds) in the mixed sample used in this example were separated within 5 minutes.

Example 12

Structure Determination of Stereoisomers by the CS Method (1)

In Example 12, the structure was determined by the CS method using the $[Co_2(R\text{-man})_2(bpy)_3](NO_3)_2$-type crystalline sponge produced in Example 10 for each of the three stereoisomeric compounds separated and collected in Example 11.

(1) Method

One granule of the $[Co_2(R\text{-man})_2(bpy)_3](NO_3)_2$-type crystalline sponge produced in Example 10 (a size of 100 μm×100 μm×100 μm multiplied by a density of 1.4 g/cm³ gives a theoretical weight of 1.4 μg; stored in chloroform until before use) and chloroform were added together to a 1.2-mL V-bottom vial. The solvent inside the crystalline sponge was replaced with acetonitrile by removing the chloroform from and adding 50 μL of acetonitrile to the vial. Multiple vials prepared as described above were placed in the fraction collector.

The components corresponding to three peaks (Peak 1, Peak 2, and Peak 3) shown in FIG. 23 for Example 11 were individually collected directly into the above vials containing the crystalline sponge (about 100 μg per peak). After the solvent was evaporated at 50° C. to a volume of about 20 μL, the vials were capped and further incubated at 50° C. for 3 days. Three days later, the crystalline sponge was recovered from each vial and analyzed by a single crystal X-ray diffractometer (Cu Kα λ, =1.5418 Å).

The measurement data was analyzed according to the methods described in Chem. Eur. J. 2017, 23, 15035-15040 and in J. Am. Chem. Soc. 2015, 137, 12045-12049.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated any of the compounds eluted as Peak 1, Peak 2, and Peak 3 shown in FIG. 23 for Example 11 is shown in Table 10.

TABLE 10

Crystallographic Data

| | Peak 1 | Peak 2 | Peak 3 |
|---|---|---|---|
| Crystal system | Monoclinic | Monoclinic | Monoclinic |
| a (Å) | 10.19140 (10) | 10.2035 (2) | 10.19700 (10) |
| b (Å) | 25.0599 (4) | 24.9273 (4) | 25.0123 (3) |
| c (Å) | 11.42750 (10) | 11.4409 (2) | 11.43370 (10) |
| β (°) | 91.9200 (10) | 92.050 (2) | 91.6080 (10) |
| V (Å³) | 2916.89 (6) | 2908.08 (9) | 2915.02 (5) |
| Measurement temperature (K.) | 100.00 (10) | 100.00 (10) | 100.00 (10) |
| Z | 2 | 2 | 2 |
| Space group | $P2_1$ | $P2_1$ | $P2_1$ |
| Rint | 0.0393 | 0.0649 | 0.0437 |
| $R_1$ | 0.0856 | 0.0713 | 0.0685 |
| $wR_2$ | 0.2211 | 0.1925 | 0.1866 |
| GoF | 1.162 | 1.079 | 1.147 |
| Flack parameter (Parsons) | 0.066 (3) | −0.014 (4) | 0.011 (2) |

Figure 24:
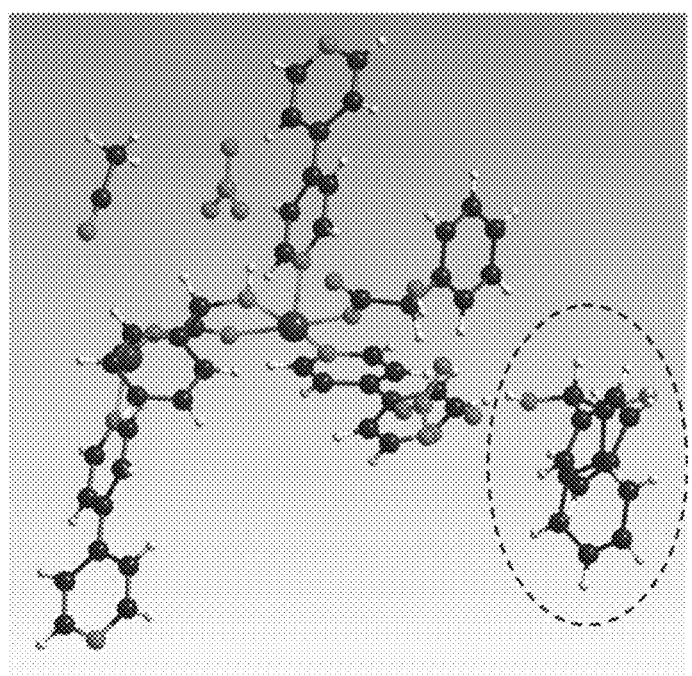
FIG. 24 shows a result (in the asymmetric unit; solvent molecules are omitted) from crystallographic analysis of a $[Co_2(R\text{-man})_2(bpy)_3](NO_3)_2$-type crystalline sponge that has incorporated the fraction corresponding to the peak 1 in FIG. 23.
Figure 25:
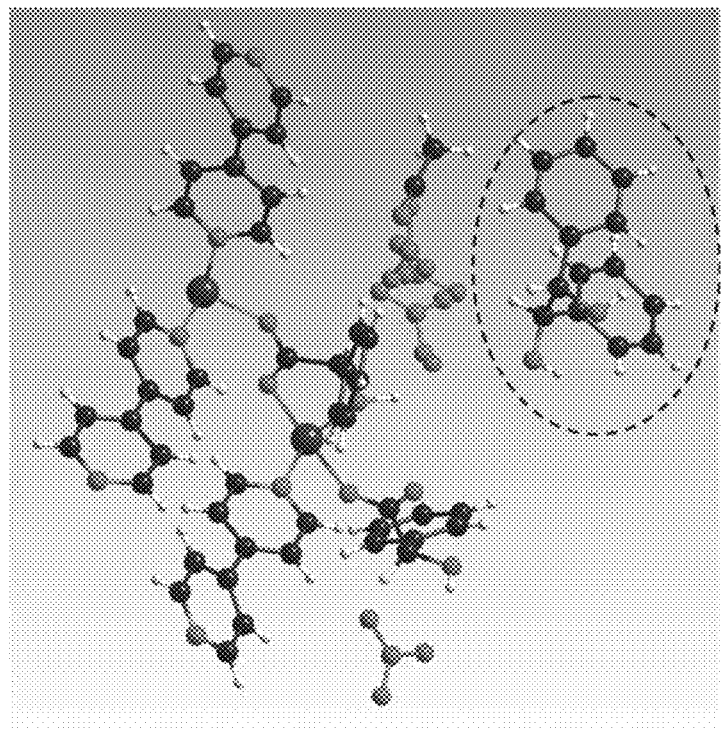
FIG. 25 shows a result (in the asymmetric unit; solvent molecules are omitted) from crystallographic analysis of a $[Co_2(R\text{-man})_2(bpy)_3](NO_3)_2$-type crystalline sponge that has incorporated the fraction corresponding to the peak 2 in FIG. 23.
Figure 26:
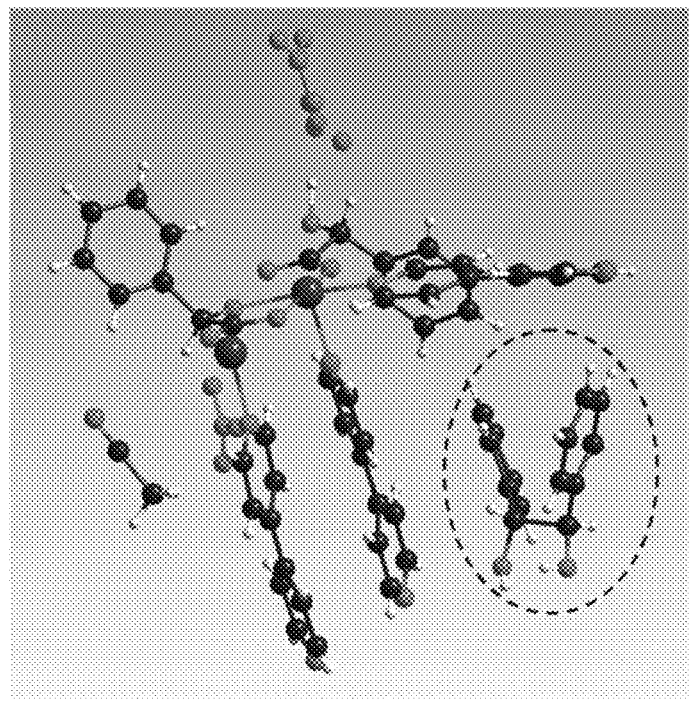
FIG. 26 shows a result (in the asymmetric unit; solvent molecules are omitted) from crystallographic analysis of a $[Co_2(R\text{-man})_2(bpy)_3](NO_3)_2$-type crystalline sponge that has incorporated the fraction corresponding to the peak 3 in FIG. 23.
Figure 27:
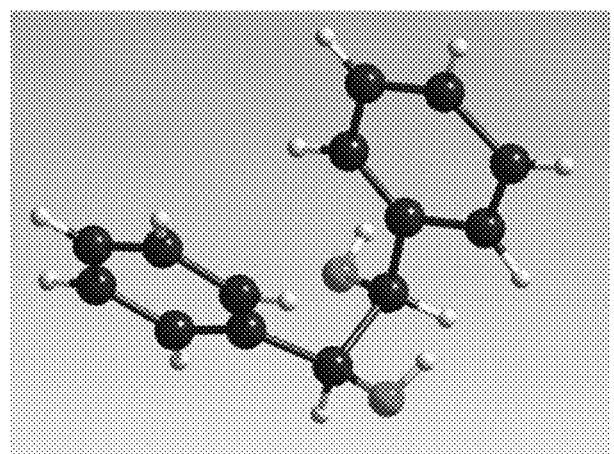
FIG. 27 shows the structure of a guest corresponding to the peak 1 in FIG. 23 identified using $[Co_2(R\text{-man})_2(bpy)_3](NO_3)_2$-type crystalline sponge by the CS method.
Figure 28:
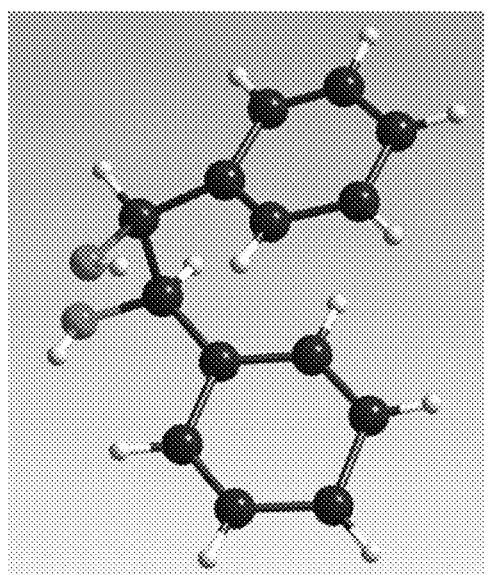
FIG. 28 shows the structure of a guest corresponding to the peak 2 in FIG. 23 identified using $[Co_2(R\text{-man})_2(bpy)_3](NO_3)_2$-type crystalline sponge by the CS method.
Figure 29:
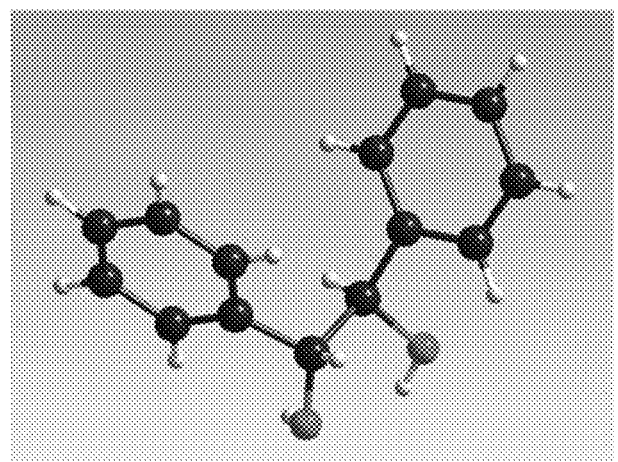
FIG. 29 shows the structure of a guest corresponding to the peak 3 in FIG. 23 identified using [Co$_2$(R-man)$_2$(bpy)$_3$](NO$_3$)$_2$-type crystalline sponge by the CS method.

Crystal structures of the asymmetric unit for the crystalline sponges that have incorporated the compounds eluted as Peak 1, Peak 2, and Peak 3 are shown in FIGS. 24, 25, and 26, respectively. Each molecule enclosed by the dotted line indicates the guest incorporated in the crystalline sponge. Additionally, the structures of only the observed guests are shown in FIGS. 27, 28, and 29, respectively. From these results, the stereoisomers corresponding to Peak 1, Peak 2, and Peak 3 were determined and identified to be (S,S)-hydrobenzoin, meso-hydrobenzoin, and (R,R)-hydrobenzoin, respectively. The results of Examples 11 and 12 have confirmed that an acetonitrile-resistant crystalline sponge can be used for analysis of the structure of a compound, wherein the compound is isolated by SFC (acetonitrile is contained in the mobile phase) and collected directly into a vial containing the crystalline sponge to allow incorporation of the compound.

Example 13

Structure Determination of Stereoisomers by the CS Method (2)

In Example 13, the structure was determined by the CS method using the $[Co_2(S\text{-man})_2(bpy)_3](NO_3)_2$-type crystalline sponge produced in Example 10 for each of the three stereoisomeric compounds separated and collected in Example 11.

(1) Method

Measurement and analysis were performed by a method similar to that in Example 12, except that the $[Co_2(R\text{-man})_2(bpy)_3](NO_3)_2$-type crystalline sponge used in Example 12 was replaced with the opposite enantiomer, $[Co_2(S\text{-man})_2(bpy)_3](NO_3)_2$-type crystalline sponge.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated any of the compounds eluted as Peak 1, Peak 2, and Peak 3 shown in FIG. 23 for Example 11 is shown in Table 11.

TABLE 11

Crystallographic Data

|  | Peak 1 | Peak 2 | Peak 3 |
|---|---|---|---|
| Crystal system | Monoclinic | Monoclinic | Monoclinic |
| a (Å) | 10.19210 (10) | 10.2010 (1) | 10.19700 (0) |
| b (Å) | 24.8616 (3) | 24.9173 (4) | 25.0123 (3) |
| c (Å) | 11.44350 (10) | 11.4379 (1) | 11.43370 (10) |
| β (°) | 91.1810 (10) | 91.991 (1) | 91.6080 (10) |
| V (Å$^3$) | 2899.07 (5) | 2905.55 (6) | 2915.02 (5) |
| Measurement temperature (K.) | 100.00 (10) | 100.00 (10) | 100.00 (10) |
| Z | 2 | 2 | 2 |
| Space group | P2$_1$ | P2$_1$ | P2$_1$ |
| Rint | 0.0421 | 0.0347 | 0.0437 |
| R$_1$ | 0.0697 | 0.0745 | 0.0685 |
| wR$_2$ | 0.1938 | 0.2024 | 0.1866 |
| GoF | 1.164 | 1.158 | 1.147 |
| Flack parameter (Parsons) | 0.014 (2) | 0.019 (4) | 0.011 (2) |

Figure 30:
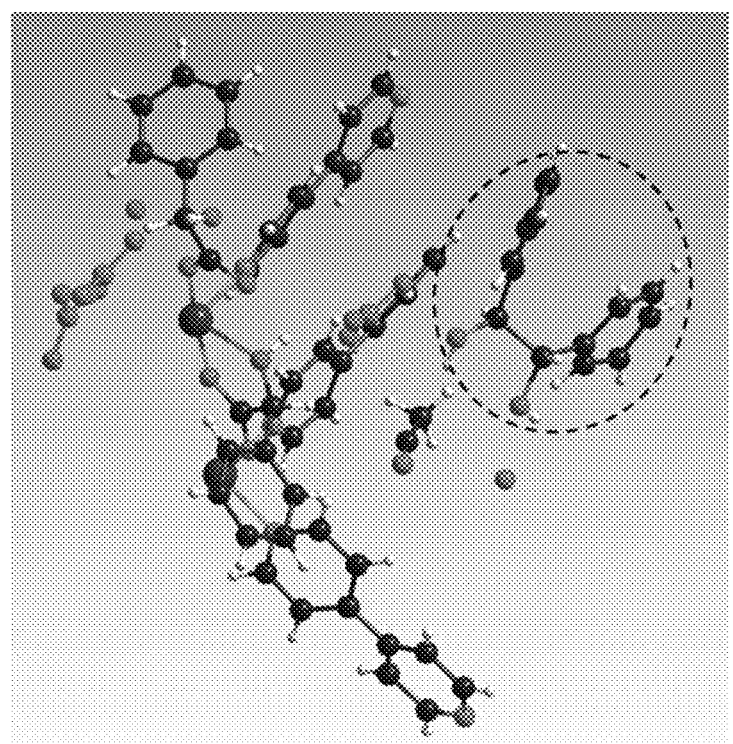
FIG. 30 shows a result (in the asymmetric unit; solvent molecules are omitted) from crystallographic analysis of a [Co$_2$(S-man)$_2$(bpy)$_3$](NO$_3$)$_2$-type crystalline sponge that has incorporated the fraction corresponding to the peak 1 in FIG. 23.
Figure 31:
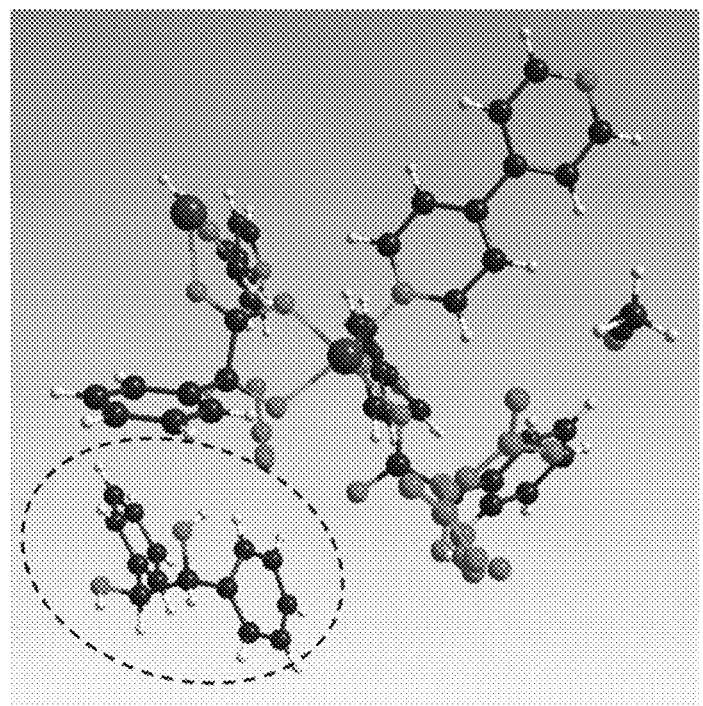
FIG. 31 shows a result (in the asymmetric unit; solvent molecules are omitted) from crystallographic analysis of a [Co$_2$(S-man)$_2$(bpy)$_3$](NO$_3$)$_2$-type crystalline sponge that has incorporated the fraction corresponding to the peak 2 in FIG. 23.
Figure 32:
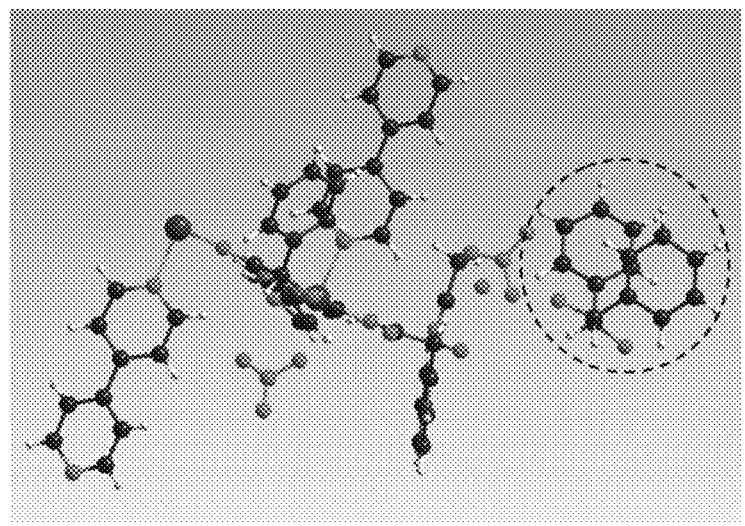
FIG. 32 shows a result (in the asymmetric unit; solvent molecules are omitted) from crystallographic analysis of a [Co$_2$(S-man)$_2$(bpy)$_3$](NO$_3$)$_2$-type crystalline sponge that has incorporated the fraction corresponding to the peak 3 in FIG. 23.
Figure 33:
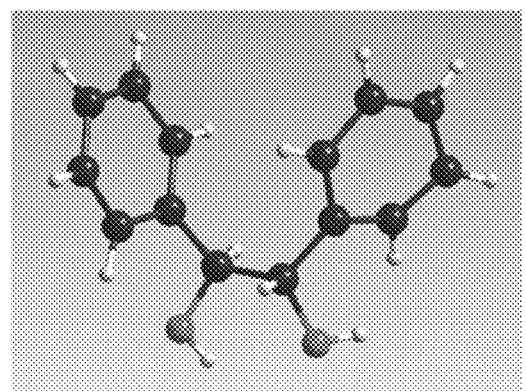
FIG. 33 shows the structure of a guest corresponding to the peak 1 in FIG. 23 identified using [Co$_2$(S-man)$_2$(bpy)$_3$](NO$_3$)$_2$-type crystalline sponge by the CS method.
Figure 34:
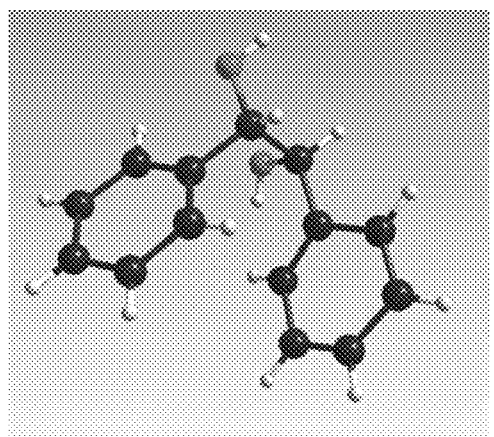
FIG. 34 shows the structure of a guest corresponding to the peak 2 in FIG. 23 identified using [Co$_2$(S-man)$_2$(bpy)$_3$](NO$_3$)$_2$-type crystalline sponge by the CS method.
Figure 35:
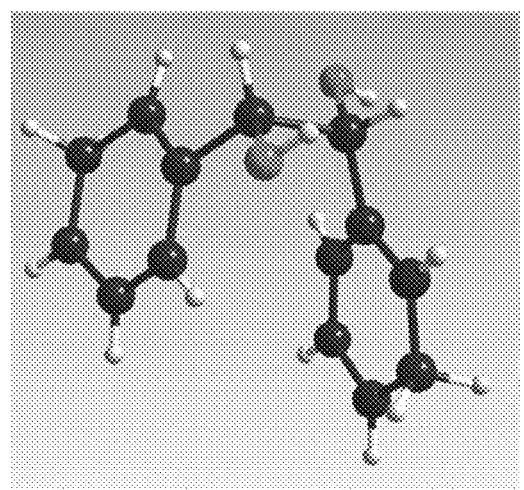
FIG. 35 shows the structure of a guest corresponding to the peak 3 in FIG. 23 identified using [Co$_2$(S-man)$_2$(bpy)$_3$](NO$_3$)$_2$-type crystalline sponge by the CS method.

Crystal structures of the asymmetric unit for the crystalline sponges that have incorporated the compounds eluted as Peak 1, Peak 2, and Peak 3 are shown in FIGS. 30, 31, and 32, respectively. Each molecule enclosed by the dotted line indicates the guest incorporated in the crystalline sponge. Additionally, the structures of only the observed guests are shown in FIGS. 33, 34, and 35, respectively. From these results, the stereoisomers corresponding to Peak 1, Peak 2, and Peak 3 were determined and identified to be (S,S)-hydrobenzoin, meso-hydrobenzoin, and (R,R)-hydrobenzoin, respectively. The results of Examples 11 and 13 have confirmed that an acetonitrile-resistant crystalline sponge can be used for analysis of the structure of a compound, wherein the compound is isolated by SFC (acetonitrile is contained in the mobile phase) and collected directly into a vial containing the crystalline sponge to allow incorporation of the compound.

The crystal structure of the [Co$_2$(R-man)$_2$(bpy)$_3$](NO$_3$)$_2$-type crystalline sponge with the incorporated compound corresponding to Peak 1 and the crystal structure of the [Co$_2$(S-man)$_2$(bpy)$_3$]NO$_3$)$_2$-type crystalline sponge with the incorporated compound corresponding to Peak 3 are minor images of each other. Similarly, the crystal structure of the [Co$_2$(R-man)$_2$(bpy)$_3$](NO$_3$)$_2$-type crystalline sponge with the incorporated compound corresponding to Peak 3 and the crystal structure of the [Co$_2$(S-man)$_2$(bpy)$_3$](NO$_3$)$_2$-type crystalline sponge with the incorporated compound corresponding to Peak 1 are mirror images of each other. Furthermore, the crystal structure of the [Co$_2$(R-man)$_2$(bpy)$_3$](NO$_3$)$_2$-type crystalline sponge with the incorporated compound corresponding to Peak 2 and the crystal structure of the [Co$_2$(S-man)$_2$(bpy)$_3$](NO$_3$)$_2$-type crystalline sponge with the incorporated compound corresponding to Peak 2 are also mirror images of each other.

Example 14

Separation of a Mixed Sample of Volatile Structural Isomers by SFC (1)

In Example 14, structural isomers of a volatile compound in a mixed sample were separated using a SFC device and a fraction collector which are the same type of devices as those used in Example 3 and employing an elution solvent identical to that used for the CS method.
(1) Method
Highly volatile monoterpenes, (+)-isomenthone (Tokyo Chemical Industry Co., Ltd.) and (−)-isopulegol (Sigma-Aldrich), were used to prepare a solution containing both of the compounds in MTBE at a concentration of 10 mg/mL each as a mixed sample of the structural isomers, and the resulting solution was subjected to SFC under the conditions described in Table 12. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 12

Conditions for SFC

| Column | CHIRALPAK IG 4.6 mm i.d. × 250 mm (particle size: 5 μm) |
|---|---|
| Column temperature | 35° C. |
| Mobile phase A | CO$_2$ |
| Mobile phase B | MTBE |
| Make-up solvent | MTBE(3 mL/min) |
| Mobile phase mixture ratio | A:B = 85:15 (isocratic) |
| Flow rate | 3 mL/min |
| Detection | UV 205 nm |
| Pressure | 10 MPa |
| Injection volume | 20 μL |
| Sample concentration | 10 mg/mL |
| Analysis time | 7 minutes |

Figure 36:
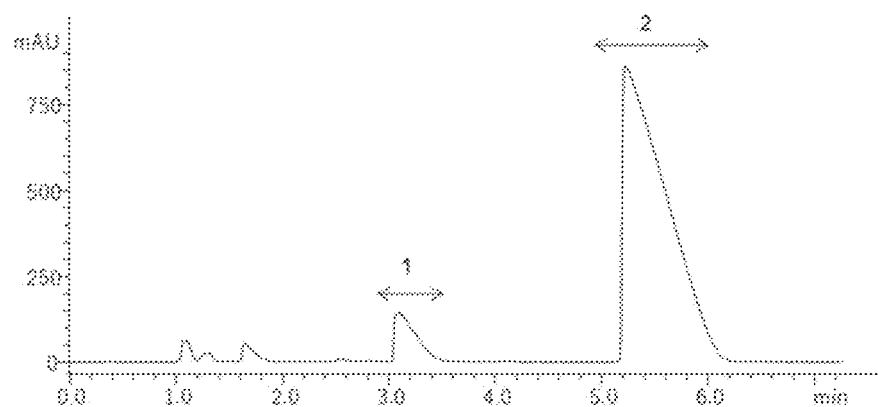
FIG. 36 shows a result (chromatogram) from analyzing a mixed sample of structural isomers of a volatile compound by SFC.

(2) Result
The result of the analysis, a chromatogram, under the above conditions was as shown in FIG. 36. The structural isomers (two volatile monoterpene compounds) in the mixed sample used in this example were separated within 7 minutes.

Example 15

Determination of Absolute Configuration by the CS Method
In Example 15, the absolute configuration was determined by the CS method for each of the two structural isomers of a volatile monoterpene compound which were separated and collected in Example 14.
(1) Method
One granule of a [(ZnCl$_2$)$_3$(tpt)$_2$·(n-hexane)$_a$]$_n$-type crystalline sponge produced by the method described in Chem. Eur. J. 2017, 23, 15035-15040 (a size of 100 μm×100 μm×100 μm multiplied by a density of 1.3 g/cm$^3$ gives a theoretical weight of 1.3 μg) and n-hexane were added to a 1.2-mL V-bottom vial. The solvent inside the crystalline sponge was replaced with methyl tert-butyl ether (MTBE) by removing the n-hexane from and adding 50 μL of MTBE to the vial. Multiple vials prepared as described above were placed in the fraction collector.

The components corresponding to the two peaks (Peak 1 and Peak 2) shown in FIG. 36 for Example 14 were individually collected directly into the above vials containing the crystalline sponge (about 200 μg per peak). After the solvent was evaporated at 50° C. to a volume of about 50 μL, the vials were capped, and each cap was pierced with an injection needle, and the vials were incubated at 50° C. to gently evaporate the remaining solvent. One day later, the crystalline sponge was recovered from each vial and analyzed by a single crystal X-ray diffractometer (Cu Kα λ, =1.5418 Å).

The measurement data was analyzed according to the method described in Chem. Eur. J. 2017, 23, 15035-15040.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 36 for Example 14 is shown in Table 13.

TABLE 13

Crystallographic Data

|  | Peak 1 | Peak 2 |
|---|---|---|
| Crystal system | Monoclinic | Monoclinic |
| a (Å) | 33.96777 (12) | 33.14265 (14) |
| b (Å) | 14.45906 (4) | 14.43794 (6) |
| c (Å) | 30.95203 (9) | 30.65267 (15) |
| β (°) | 99.8945 (3) | 99.7981 (4) |
| V (Å$^3$) | 14389.41 (7) | 14453.70 (11) |
| Measurement temperature (K.) | 99.8 (4) | 100.00 (16) |
| Z | 4 | 4 |
| Space group | C2 | C2 |
| Rint | 0.0196 | 0.0296 |
| $R_1$ | 0.0676 | 0.0623 |
| $wR_2$ | 0.2273 | 0.2053 |
| GoF | 1.056 | 1.080 |
| Flack parameter (Parsons) | 0.038 (6) | 0.046 (5) |

Figure 37:
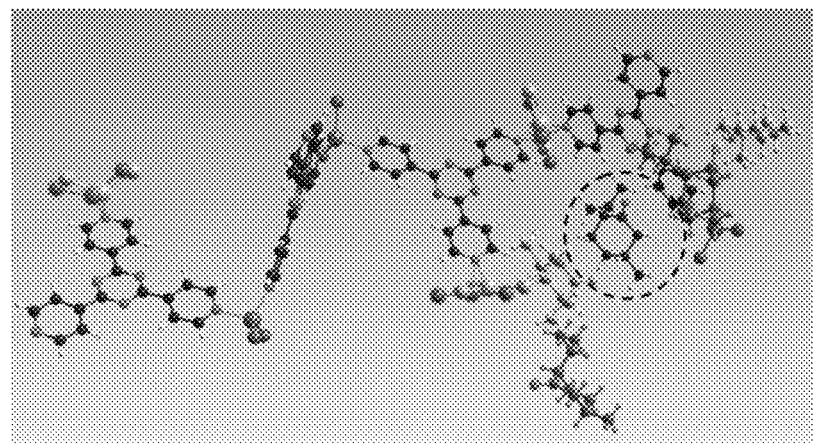
FIG. 37 shows a result (in the asymmetric unit; solvent molecules are omitted) from crystallographic analysis of a crystalline sponge that has incorporated the fraction corresponding to the peak 1 in FIG. 36.
Figure 38:
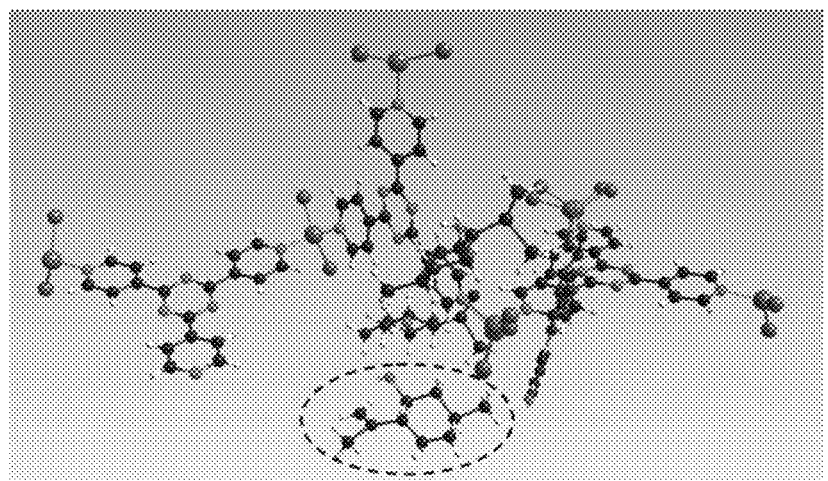
FIG. 38 shows a result (in the asymmetric unit; solvent molecules are omitted) from crystallographic analysis of a crystalline sponge that has incorporated the fraction corresponding to the peak 2 in FIG. 36.
Figure 39:
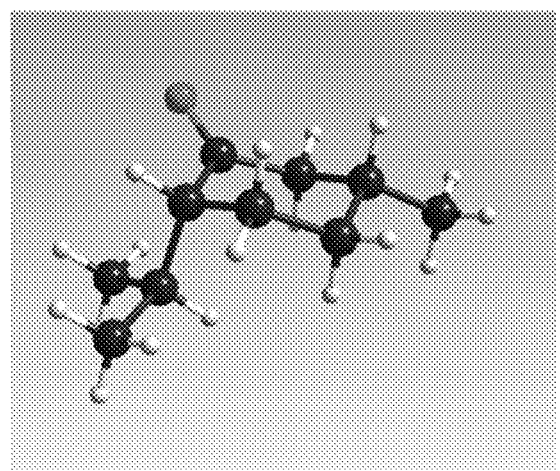
FIG. 39 shows the structure of a guest corresponding to the peak 1 in FIG. 36 identified by the CS method.
Figure 40:
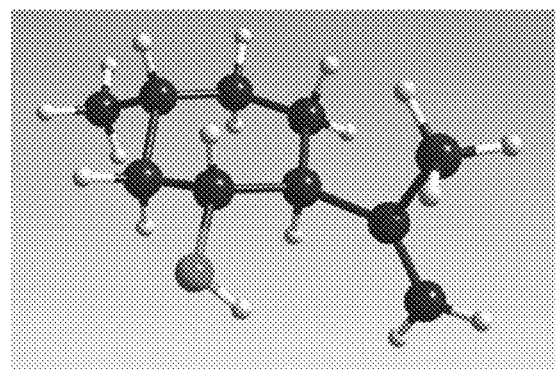
FIG. 40 shows the structure of a guest corresponding to the peak 2 in FIG. 36 identified by the CS method.

Crystal structures of the asymmetric unit for the crystalline sponges that have incorporated the compounds eluted as Peak 1, and Peak 2 are shown in FIGS. 37, and 38, respectively. Each molecule enclosed by the dotted line indicates the guest incorporated in the crystalline sponge. Additionally, the structures of only the observed guests are shown in FIGS. 39 and 40, respectively. From these results, the compounds corresponding to Peak 1 and Peak 2 were determined and identified to be (+)-isomenthone ((2R,5R)-5-methyl-2-(propane-2-yl)cyclohexanone) and (−)-isopulegol ((1R,2S,5R)-2-isopropenyl-5-methylcyclohexanol), respectively. The results of Examples 14 and 15 have confirmed that the structure of a volatile compound can be analyzed by isolating the compound by SFC and collecting the compound directly into a vial containing a crystalline sponge to allow incorporation of the compound.

Example 16

Separation of a Mixed Sample of Volatile Structural Isomers by SFC (2)

In Example 16, structural isomers of a volatile compound in a mixed sample were separated using a SFC device and a fraction collector which are the same type of devices as those used in Example 3 and employing an elution solvent identical to that used for the CS method.

(1) Method

Volatile sesquiterpenes, (+)-β-eudesmol (FUJIFILM Wako Pure Chemical Corporation) and (−)-α-bisabolol (Sigma-Aldrich), were used to prepare a solution containing both of the compounds in MTBE at a concentration of 10 mg/mL each as a mixed sample of the structural isomers, and the resulting solution was subjected to SFC under the conditions described in Table 14. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 14

Conditions for SFC

| Column | CHIRALPAK IG 4.6 mm i.d. × 250 mm (particle size: 5 μm) |
|---|---|
| Column temperature | 35° C. |
| Mobile phase A | $CO_2$ |
| Mobile phase B | MTBE |
| Make-up solvent | MTBE(1-2 mL/min) |
| Mobile phase mixture ratio | A:B = 50:50 (isocratic) |
| Flow rate | 3 mL/min |
| Detection | UV 205 nm |
| Pressure | 10 MPa |
| Injection volume | 20 μL |
| Sample concentration | 10 mg/mL |
| Analysis time | 9 minutes |

(2) Result

Figure 41:
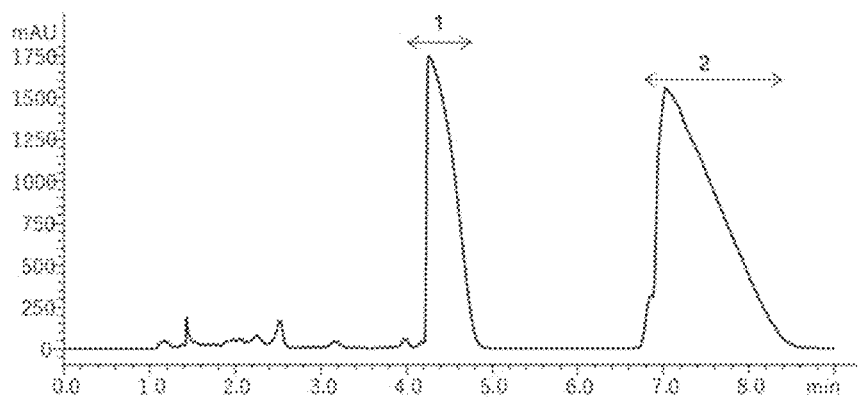
FIG. 41 shows a result (chromatogram) from analyzing a mixed sample of structural isomers of a volatile compound by SFC.

The result of the analysis, a chromatogram, under the above conditions was as shown in FIG. 41. The structural isomers (two volatile sesquiterpene compounds) in the mixed sample used in this example were separated within 9 minutes.

Example 17

Determination of Absolute Configuration by the CS Method

In Example 17, the absolute configuration was determined by the CS method for each of the two structural isomers of a volatile sesquiterpene compound separated and collected in Example 16.

(1) Method

One granule of a [(ZnCl$_2$)$_3$(tpt)$_2$·(n-hexane)$_a$]$_n$-type crystalline sponge produced by the method described in Chem. Eur. J. 2017, 23, 15035-15040 (a size of 100 μm×100 μm×100 μm multiplied by a density of 1.3 g/cm$^3$ gives a theoretical weight of 1.3 μg) and n-hexane were added to a 1.2-mL V-bottom vial. The solvent inside the crystalline sponge was replaced with methyl tert-butyl ether (MTBE) by removing the n-hexane from and adding 50 μL of MTBE to the vial. Multiple vials prepared as described above were placed in the fraction collector.

The components corresponding to the two peaks (Peak 1 and Peak 2) shown in FIG. 41 for Example 16 were individually collected directly into the above vials containing the crystalline sponge (about 200 μg per peak). After the solvent was evaporated at 50° C. to a volume of about 50 μL, the vials were capped, and each cap was pierced with an injection needle, and the vials were incubated at 50° C. to gently evaporate the remaining solvent. One day later, the crystalline sponge was recovered from each vial and analyzed by a single crystal X-ray diffractometer (Cu Kα λ, =1.5418 Å).

The measurement data was analyzed according to the method described in Chem. Eur. J. 2017, 23, 15035-15040.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 41 for Example 16 is shown in Table 15.

TABLE 15

Crystallographic Data

|  | Peak 1 | Peak 2 |
|---|---|---|
| Crystal system | Monoclinic | Monoclinic |
| a (Å) | 33.12401 (15) | 33.42421 (15) |
| b (Å) | 14.46180 (6) | 14.43311 (5) |
| c (Å) | 30.73803 (14) | 31.30072 (14) |
| β (°) | 99.7599 (4) | 101.5552 (4) |
| V (Å$^3$) | 14511.42 (11) | 14793.90 (11) |
| Measurement temperature (K.) | 99.96 (13) | 100.01 (10) |
| Z | 4 | 4 |
| Space group | C2 | C2 |
| Rint | 0.0259 | 0.0267 |
| R$_1$ | 0.0458 | 0.0564 |
| wR$_2$ | 0.1394 | 0.1799 |
| GoF | 1.048 | 1.084 |
| Flack parameter (Parsons) | 0.023 (3) | 0.046 (5) |

Figure 42:
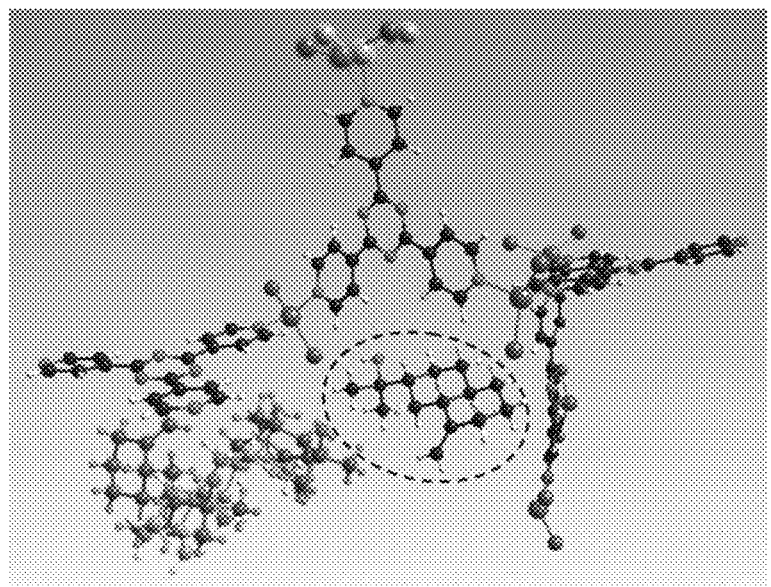
FIG. 42 shows a result (in the asymmetric unit; solvent molecules are omitted) from crystallographic analysis of a crystalline sponge that has incorporated the fraction corresponding to the peak 1 in FIG. 41.
Figure 43:
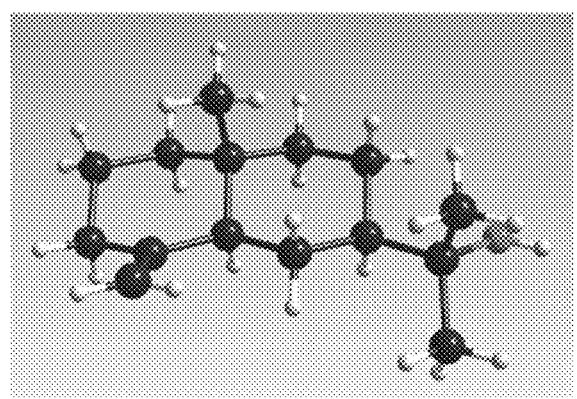
FIG. 43 shows a result (in the asymmetric unit; solvent molecules are omitted) from crystallographic analysis of a crystalline sponge that has incorporated the fraction corresponding to the peak 2 in FIG. 41.
Figure 44:
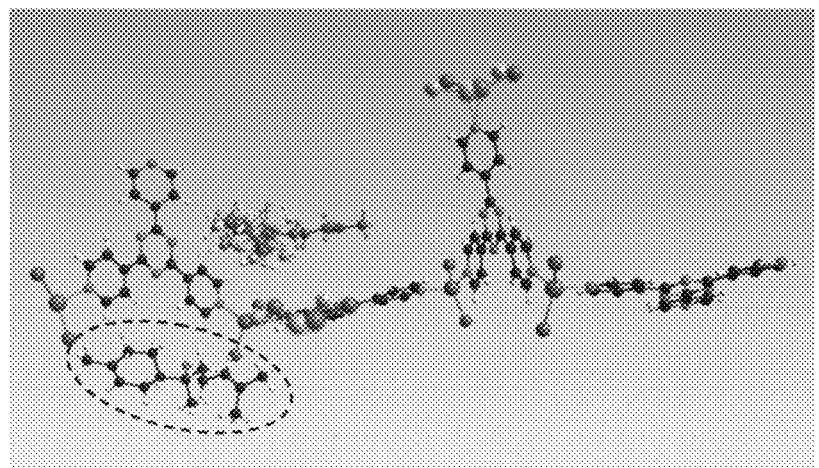
FIG. 44 shows the structure of a guest corresponding to the peak 1 in FIG. 41 identified by the CS method.
Figure 45:
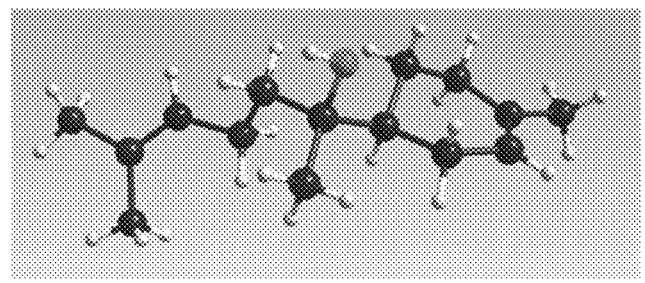
FIG. 45 shows the structure of a guest corresponding to the peak 2 in FIG. 41 identified by the CS method.

Crystal structures of the asymmetric unit for the crystalline sponges that have incorporated the compounds eluted as Peak 1 and Peak 2 are shown in FIGS. 42 and 43, respectively. Each molecule enclosed by the dotted line indicates the guest incorporated in the crystalline sponge. Additionally, the structures of only the observed guests are shown in FIGS. 44 and 45, respectively. From these results, the compounds corresponding to Peak 1 and Peak 2 were determined and identified to be (+)-β-eudesmol ((3R,4aS)-decahydro-5-methylene-α,α,8aβ-trimethyl-3β-naphthalenemethanol) and (−)-α-bisabolol ((2S)-6-methyl-2-[(1S)-4-methylcyclohex-3-en-1-yl]hept-5-en-2-ol), respectively. The results of Examples 16 and 17 have confirmed that the structure of a volatile compound can be analyzed by isolating the compound by SFC and collecting the compound directly into a vial containing a crystalline sponge to allow incorporation of the compound.

Example 18

Production of an Isopropanol-Resistant Crystalline Sponge

When isopropanol was used as an elution solvent for SFC, the [(ZnCl$_2$)$_3$(tpt)$_2$·(n-hexane)$_a$]$_n$-type crystalline sponge was found to be labile to isopropanol, so that seamless performance of SFC and the CS method failed. Then, production of an isopropanol-resistant crystalline sponge was studied in Example 18.

(1) Method

A [Co$_2$(R-man)$_2$(bpy)$_3$](NO$_3$)$_2$-type crystalline sponge and a [Co$_2$(S-man)$_2$(bpy)$_3$](NO$_3$)$_2$-type crystalline sponge were produced by synthesis from 4,4'-bipyridine (bpy), (S)-mandelic acid (S-man) or (R)-mandelic acid (R-man), and Co(NO$_3$)$_2$ according to the method described in J. Am. Chem. Soc. 2015, 137, 12045-12049. These crystalline sponges were soaked in isopropanol for several days, and the crystal structures of the crystalline sponges were then analyzed.

(2) Result

Figure 46:
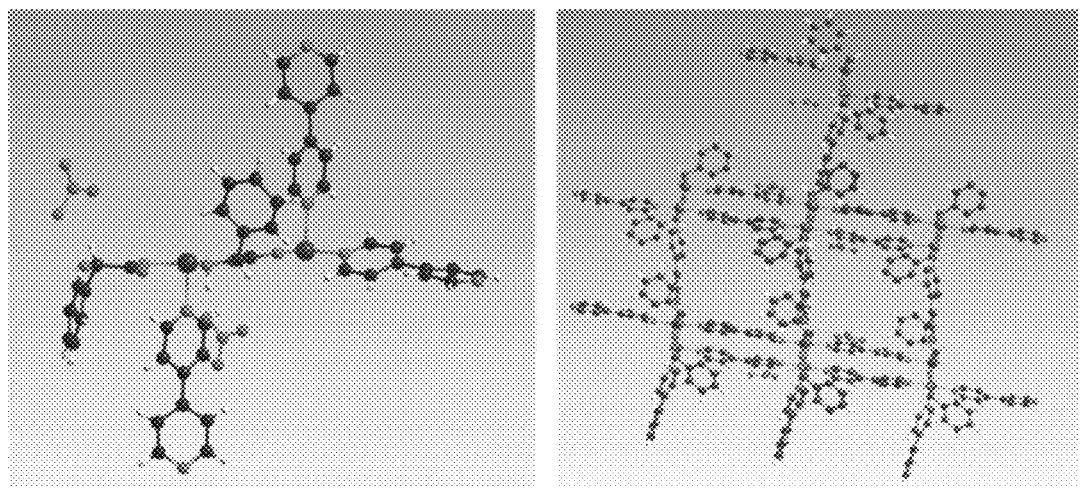
FIG. 46 shows the crystal structure of a [Co$_2$(R-man)$_2$(bpy)$_3$](NO$_3$)$_2$-type crystalline sponge (left: in the asymmetric unit; right: in packing) soaked in isopropanol for several days.

The inventors found that the crystal structures of the [Co$_2$(R-man)$_2$(bpy)$_3$](NO$_3$)$_2$-type and [Co$_2$(S-man)$_2$(bpy)$_3$](NO$_3$)$_2$-type crystalline sponges were precisely measured and observed even after the crystalline sponges were soaked in isopropanol for several days (FIG. 46).

Example 19

Separation of Enantiomers of a Volatile Racemate by SFC

In Example 19, enantiomers of a volatile racemate were separated using a SFC device and a fraction collector which are the same type of devices as those used in Example 3 and employing an elution solvent identical to that used for the CS method.

(1) Method

A volatile monoterpene racemate, rac-terpinen-4-ol (FUJIFILM Wako Pure Chemical Corporation), was used as a volatile racemic sample, and the sample prepared in isopropanol at a concentration of 20 mg/mL was subjected to SFC under the conditions described in Table 16. In accordance with Example 3, the Shimadzu Nexera UC (Shimadzu Corporation) was used as a SFC device, and each separated compound was collected by a fraction collector FRC-40 SF (Shimadzu Corporation). A make-up solvent was delivered at a constant flow rate into the fraction collector to increase the efficiency of sample collection.

TABLE 16

Conditions for SFC

| Column | CHIRALPAK IG 4.6 mm i.d. × 250 mm (particle size: 5 μm) |
|---|---|
| Column temperature | 35° C. |
| Mobile phase A | CO$_2$ |
| Mobile phase B | isopropanol |
| Make-up solvent | isopropanol(2 mL/min) |
| Mobile phase mixture ratio | A:B = 95:5 (isocratic) |
| Flow rate | 3 mL/min |
| Detection | UV 205 nm |
| Pressure | 10 MPa |
| Injection volume | 20 μL |
| Sample concentration | 20 mg/mL |
| Analysis time | 6 minutes |

(2) Result

Figure 47:
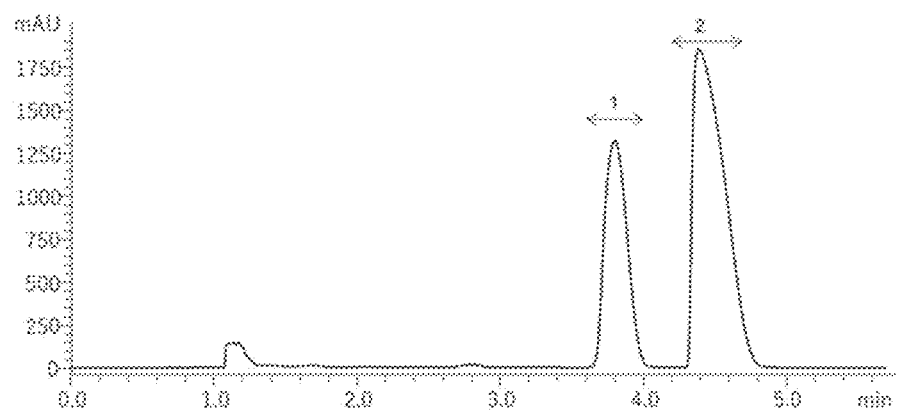
FIG. 47 shows a result (chromatogram) from analyzing a volatile racemic sample by SFC.

The result of the analysis, a chromatogram, under the above conditions was as shown in FIG. 47. The two enantiomers of the volatile monoterpene racemic compound were separated within 5 minutes.

Example 20

Determination of Absolute Configuration by the CS Method

In Example 20, the absolute configuration was determined by the CS method using the crystalline sponge produced in Example 18 for each of the enantiomeric compounds separated and collected in Example 19.

(1) Method

One granule of the [Co$_2$(S-man)$_2$(bpy)$_3$](NO$_3$)$_2$-type crystalline sponge produced in Example 18 (a size of 100 μm×100 μm×100 μm multiplied by a density of 1.4 g/cm$^3$ gives a theoretical weight of 1.4 μg; stored in chloroform until before use) and chloroform were added together to a 1.2-mL V-bottom vial. The solvent inside the crystalline sponge was replaced with isopropanol by removing the chloroform from and 50 μL of isopropanol to the vial. Multiple vials prepared as described above were placed in the fraction collector.

The components corresponding to the two peaks (Peak 1 and Peak 2) shown in FIG. 47 for Example 19 were individually collected directly into the above vials containing the crystalline sponge (about 200 μg per peak). After the solvent was gently evaporated under nitrogen gas flow to a volume of about 50 μL, the vials were capped and incubated at 50° C. for 3 days. Three days later, the crystalline sponge was recovered from each vial and analyzed by a single crystal X-ray diffractometer (Cu Kα λ, =1.5418 Å).

The measurement data was analyzed according to the methods described in Chem. Eur. J. 2017, 23, 15035-15040 and in J. Am. Chem. Soc. 2015, 137, 12045-12049.

(2) Result

The measurement by a single crystal X-ray diffractometer and the analysis of the measurement data resulted in observation of the structure of each guest compound incorporated in the crystalline sponge. The crystallographic data from the analysis of the crystalline sponges that have incorporated either of the compounds eluted as Peak 1 and Peak 2 shown in FIG. 47 for Example 19 is shown in Table 17.

TABLE 17

Crystallographic Data

|  | Peak 1 | Peak 2 |
|---|---|---|
| Crystal system | Monoclinic | Monoclinic |
| a (Å) | 10.1997 (2) | 10.17849 (18) |
| b (Å) | 24.6572 (6) | 24.7746 (4) |
| c (Å) | 11.4298 (2) | 11.42571 (14) |
| β (°) | 92.4691 (17) | 91.4303 (12) |
| V (Å$^3$) | 2871.88 (10) | 2880.30 (7) |
| Measurement temperature (K.) | 100.00 (10) | 100.00 (10) |
| Z | 2 | 2 |
| Space group | P2$_1$ | P2$_1$ |
| Rint | 0.0706 | 0.0512 |
| R$_1$ | 0.0876 | 0.0610 |
| wR$_2$ | 0.2317 | 0.1716 |
| GoF | 1.083 | 1.057 |
| Flack parameter (Parsons) | 0.006 (8) | 0.010 (4) |

Figure 48:
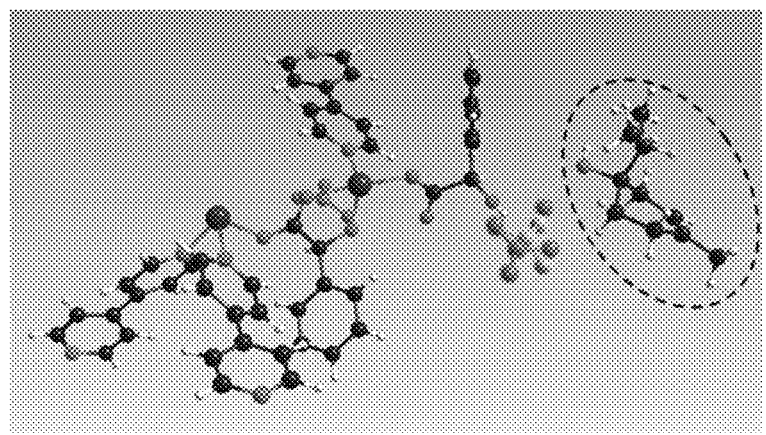
FIG. 48 shows a result (in the asymmetric unit; solvent molecules are omitted) from crystallographic analysis of a crystalline sponge that has incorporated the fraction corresponding to the peak 1 in FIG. 47.
Figure 49:
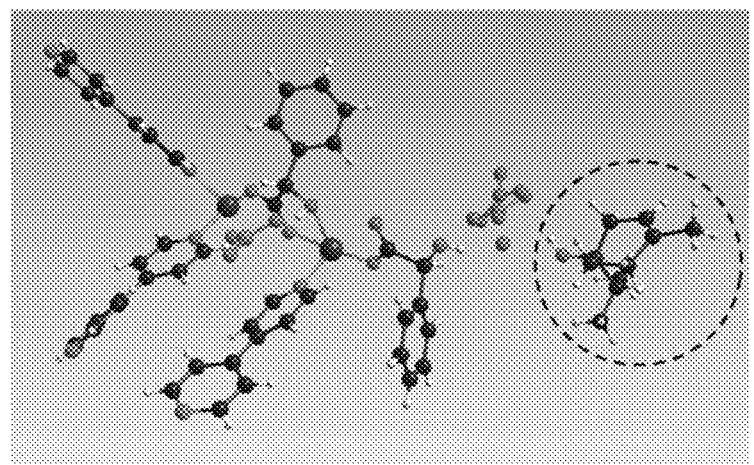
FIG. 49 shows a result (in the asymmetric unit; solvent molecules are omitted) from crystallographic analysis of a crystalline sponge that has incorporated the fraction corresponding to the peak 2 in FIG. 47.
Figure 50:
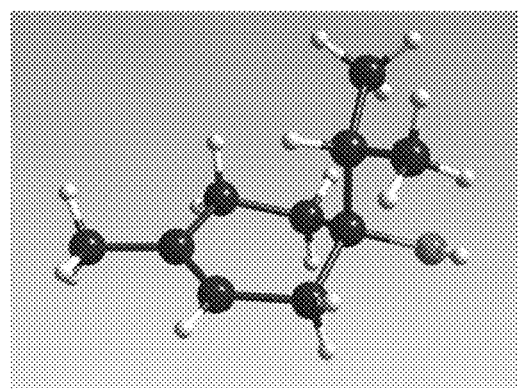
FIG. 50 shows the structure of a guest corresponding to the peak 1 in FIG. 47 identified by the CS method.
Figure 51:
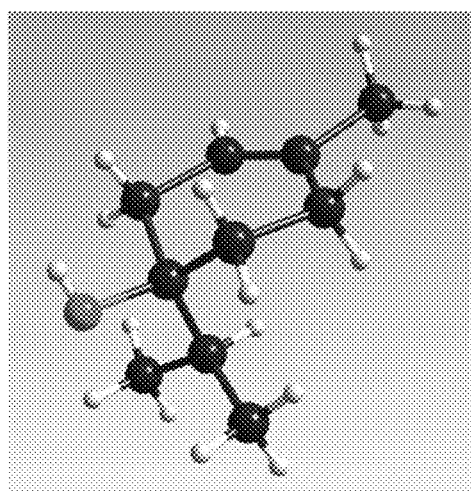
FIG. 51 shows the structure of a guest corresponding to the peak 2 in FIG. 47 identified by the CS method.

Crystal structures of the asymmetric unit for the crystalline sponges that have incorporated the compounds eluted as Peak 1 and Peak 2 are shown in FIGS. 48 and 49, respectively. Each molecule enclosed by the dotted line indicates the guest incorporated in the crystalline sponge. Additionally, the structures of only the observed guests are shown in FIGS. 50 and 51, respectively. From these results, the enantiomers corresponding to Peak 1 and Peak 2 were determined and identified to be S-terpinen-4-ol ((4S)-4-isopropyl-1-methyl-1-cyclohexen-4-ol) and R-terpinen-4-ol ((4R)-4-isopropyl-1-methyl-1-cyclohexen-4-ol), respectively. The results of Examples 18, 19, and 20 have confirmed that an isopropanol-resistant crystalline sponge can be used for analysis of the structure of a volatile compound, wherein the compound is isolated by SFC (isopropanol is contained in the mobile phase) and collected directly into a vial containing the crystalline sponge to allow incorporation of the compound.

Example 21

Determination of Absolute Configuration by the CS Method Using a Conventional Crystalline Sponge with Removal of Isopropanol Under Nitrogen Gas Flow Isopropanol destroys [(ZnCl$_2$)$_3$(tpt)$_2$]$_n$-type crystalline sponges. Thus, the inventors studied in Example 21 whether or not removal of isopropanol contained in an eluate under nitrogen gas flow would allow the absolute configuration of a volatile compound to be determined by the CS method. Specifically, the following procedure was adopted.

Empty vials were first placed in a fraction collector, and the components corresponding to the two peaks (Peak 1 and Peak 2) shown in FIG. 47 for Example 19 were individually collected into the vials (about 200 μg per peak). After isopropanol contained in each eluate was removed under nitrogen gas flow ([(ZnCl$_2$)$_3$(tpt)$_2$]$_n$-type crystalline sponges are destroyed by isopropanol), a [(ZnCl$_2$)$_3$(tpt)$_2$]$_n$-type crystalline sponge and 50 μL of MTBE were added together to each vial. The vials were capped, and each cap was pierced with an injection needle, and the vials were incubated at 50° C. to gently evaporate the remaining solvent. One day later, the crystalline sponge was recovered from each vial and analyzed by a single crystal X-ray diffractometer (Cu Kα λ=1.5418 Å). However, the target compound of analysis was not observed. Possible loss of the volatile target compound during the removal of isopropanol from the eluate was considered as a reason for the unsuccessful observation.

Accordingly, the results of Examples 18, 19, and 20 demonstrated that seamless performance of SFC and the CS method would be especially advantageous for analysis of a tiny amount of a volatile compound.

The invention claimed is:

1. A method of determining the structure of a target substance contained in a mixture of two or more substances, the method comprising the steps of: (A) isolating the target substance from the mixture by means of supercritical fluid chromatography, (B) soaking the isolated target substance into a crystalline sponge to produce a sample for crystallography, and (C) performing a crystallographic analysis on the sample for crystallography, wherein, in the step (A), a volatile solvent is used as a mobile phase in the supercritical fluid chromatography.

2. The method according to claim 1, further comprising the step of evaporating the volatile solvent in the isolated target substance after the step (A) and before the step (B).

3. The method according to claim 1, wherein the steps (A), (B), and (C) are performed sequentially.

4. The method according to claim 3, wherein the volatile solvent used as a mobile phase in the supercritical fluid chromatography of the step (A) is a solvent which can be used for the soaking into a crystalline sponge in the step (B).

5. The method according to claim 3, wherein a device for performing the step (A) and a device for performing the step (B) are seamlessly connected together to perform the steps (A), (B), and (C).

6. The method according to claim 1, wherein the target substance contained in the mixture has an octanol-water partition coefficient (log P$_{ow}$) of not less than-4.6.

7. The method according to claim 1, wherein the target substance is an enantiomer.

\* \* \* \* \*